United States Patent [19]

Millet

[11] Patent Number: 4,849,388

[45] Date of Patent: Jul. 18, 1989

[54] ORGANOTIN CURING CATALYST FOR VULCANIZABLE ORGANOPOLYSILOXANES

[75] Inventor: Claude Millet, Saint-Priest, France

[73] Assignee: Rhone-Poulenc Specialites Chimiques, Courbevoie, France

[21] Appl. No.: 172,224

[22] Filed: Mar. 23, 1988

Related U.S. Application Data

[62] Division of Ser. No. 001,865, Jan. 9, 1987, Pat. No. 4,749,766.

[30] Foreign Application Priority Data

Jan. 9, 1986 [FR] France ............................. 86 00404

[51] Int. Cl.$^4$ ............................. B01J 31/12; C08F 4/42
[52] U.S. Cl. .................................... 502/102; 502/152; 502/155
[58] Field of Search ............... 502/150, 152, 154, 155, 502/156, 158, 102

[56] References Cited

U.S. PATENT DOCUMENTS

| | | | |
|---|---|---|---|
| 3,708,467 | 1/1973 | Smith et al. | 260/185 |
| 4,517,337 | 5/1985 | Lockhart et al. | 528/34 X |
| 4,554,310 | 11/1985 | Wengroutus et al. | 528/34 X |

FOREIGN PATENT DOCUMENTS 147323 7/1985 European Pat. Off. .

*Primary Examiner*—Patrick P. Garvin
*Assistant Examiner*—George R. Fourson
*Attorney, Agent, or Firm*—Burns, Doane, Swecker & Mathis

[57] ABSTRACT

Novel organotin curing catalysts for, e.g., the RTV organopolysiloxanes, whether single- or two-component such compositions, are comprised of admixture of (i) a diorganotin bis($\beta$-diketonate) and (ii) an organotin (IV) compound devoid of $\beta$-diketonato functional group. The silicone elastomers produced thereby are notably well adopted for use in the building industry.

1 Claim, No Drawings

ORGANOTIN CURING CATALYST FOR VULCANIZABLE ORGANOPOLYSILOXANES

This application is a division of application Ser. No. 001,865, filed Jan. 09, 1987, now U.S. Pat. No. 4,749,766.

BACKGROUND OF THE INVENTION

1. Field of the Invention

The present invention relates to novel tin curing catalysts for converting organopolysiloxane compositions into silicone elastomers, and, more especially, to such catalysts comprised of a mixture of a diorganotin bis($\beta$-diketonate) and an organotin (IV) compound devoid of any $\beta$-diketonato functional group.

2. Description of Prior Art

A wide variety of tin compounds have already been proposed to this art as catalysts for crosslinking polyorganosiloxane compositions and in particular RTV compositions (compositions which can be vulcanized at ambient temperature) in a single pack or in two packs, otherwise known as single- or two-component compositions.

The most commonly employed compounds are tin carboxylates, such as tributyltin monooleate, tin 2-ethylhexanoate or dialkyltin dicarboxylates, such as dibutyltin dilaurate and dibutyltin diacetate (see the Noll text *Chemistry And Technology Of Silicones*, pages 337, 2nd Edition, Academic Press (1968).

In U.S. Pat. No. 3,186,963, the tin catalyst proposed for such purpose is the reaction product of a tin salt, especially dibutyltin dilaurate, with ethyl polysilicate.

According to U.S. Pat. No. 3,862,919, the tin catalyst proposed is the reaction product of a dialkyldialkoxysilane with a tin carboxylate.

According to Belgian Pat. No. 842,305, the catalyst thus proposed is the reaction product of an alkyl silicate or of an alkyl trialkoxysilane with dibutyltin diacetate.

In U.S. Pat. No. 3,708,467 a catalytic system is described consisting of a mixture of certain tin salts with a specific titanium chelate, in a single-component composition.

Lastly, in published European Patent Application EP-A No. 147,323 and in U.S. Pat. Nos. 4,517,337 and 4,554,310 there is described the use of diorganotin bis($\beta$-diketonates) for crosslinking neutral single-component compositions (U.S. Pat. No. 4,517,337 and U.S. Pat. No. 4,554,310), or for single- and two-component compositions (EP-A No. 147,323).

Although EP-A No. 147,323 has enabled considerable progress in the search for a tin catalyst capable of being used both for single- and two-component compositions, it has become apparent that diorganotin bis($\beta$-diketonate) compounds exhibit a core setting time which is somewhat slow, especially for two-component compositions.

In general, in the case of the single-component compositions, a basic problem which is encountered is that of the storage stability and of the retention of the physicochemical properties (extrudability, castability, setting time) of the composition, and of retention of these same properties by the crosslinked material (mechanical properties, hardness, elongation, tear strength, adhesiveness, and the like).

Serious need exists in this art for a catalyst which crosslinks very rapidly in moist air and at the surface, but which at the same time ensures a core crosslinking which is as thorough as possible, and which is active in low concentrations, while minimizing the decomposition reactions of the crosslinked material, which are inherent in the presence of tin.

Insofar as the product crosslinked material is concerned, the same problems exist in the case of the single-component compositions, but, in addition, the process time, namely, the time during which the composition can be used after mixing without hardening, must be sufficiently long to permit its use, but sufficiently short to produce a molded shaped article which can be handled not later than 24 hours after its manufacture.

Such catalyst must, therefore, enable a satisfactory compromise between the utilization time of the catalyzed mixture and the time after which the molded article can be handled. In addition, the catalyst must provide the catalyzed mixture with a spreading time which does not vary as a function of storage time.

Furthermore, the tensile properties of the crosslinked materials, especially hardness and tear strength, must remain stable under storage.

SUMMARY OF THE INVENTION

Accordingly, a major object of the present invention is the provision of an improved catalyst system which can be used for crosslinking both single- and two-component organopolysiloxane elastomeric compositions.

Another object of the present invention is the provision of a catalyst system of the above type which simultaneously satisfies the constraints which are common to storage, application and crosslinking of both categories of elastomeric compositions, while at the same time solving the specific problems posed by each without, however, presenting any harmful secondary or side effects in either.

Briefly, the invention features organopolysiloxane compositions comprising, on the one hand, a base composition capable of curing into a silicone elastomer at ambient temperature and above, and, on the other, an organotin curing catalyst system which comprises a mixture of a diorganotin bis($\beta$-diketonate) with an organic derivative of tin of valency IV devoid of any $\beta$-diketonato group. The latter derivative contains at least one tin atom, each of which atoms bears two organic radicals bonded via a Sn-C bond, the remaining two valencies being satisfied by organic or inorganic radicals bonded via a Sn-O, or Sn-S bond, oxygen or halogen atoms, and/or hydroxyl radicals.

DETAILED DESCRIPTION OF THE PREFERRED EMBODIMENTS OF THE INVENTION

More particularly according to the present invention, the diorganotin bis($\beta$-diketonates) comprising the subject tin catalyst systems are advantageously chelated compounds corresponding to the formula:

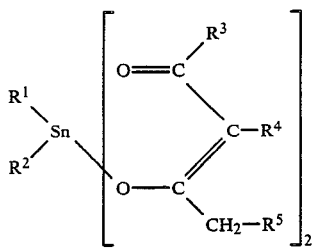

wherein $R^1$ and $R^2$, which are identical or different, are each $C_1$-$C_{12}$ organic radicals.

More especially, such organic radicals $R^1$ and $R^2$ include:

(i) halogenated or nonhalogenated $C_1$-$C_{12}$ alkyl radicals, such as methyl, ethyl, propyl, isopropyl, butyl, isobutyl, secondary butyl, tert-butyl, pentyl, hexyl, heptyl, 2-ethylhexyl, octyl, decyl, dodecyl, chloromethyl or 2,5-dichloroethyl radicals, (ii) halogenated or nonhalogenated $C_2$-$C_8$ alkenyl radicals, such as vinyl, allyl, methallyl, 2-butenyl, 2-pentenyl, 3-octenyl or 5-fluoro-2-pentenyl radicals, (iii) halogenated or nonhalogenated $C_4$-$C_8$ cycloalkyl radicals such as cyclopentyl, cyclohexyl, methylcyclohexyl, cyclooctyl, 3,4-dichlorocyclohexyl or 2,6-dibromocycloheptyl radicals, (iv) halogenated or nonhalogenated monocyclic $C_6$-$C_{10}$ aryl radicals, such as phenyl, tolyl, xylyl, cumenyl, chlorophenyl, dichlorophenyl, trichlorophenyl, difluorophenyl or trifluoromethylphenyl radicals, (v) halogenated or nonhalogenated monocyclic $C_7$-$C_{12}$ arylalkyl radicals, such as benzyl, phenylethyl, phenylpropyl or trifluoromethylphenylethyl radicals, (vi) halogenated or nonhalogenated $C_1$-$C_5$ alkoxy radicals, such as methoxy, ethoxy, propoxy, butoxy, pentoxy, chloromethoxy, dichloroethoxy or dichloropentoxy radicals, and (vii) $C_1$-$C_6$ acyloxy radicals, such as acetoxy, propanoyloxy, butanoyloxy, pentanoyloxy or hexanoyloxy radicals.

The symbols $R^3$ and $R^5$, which are identical or different, have the same meaning as $R^1$ and $R^2$, namely, $C_1$-$C_{12}$ organic radicals, and may additionally be halogen atoms, cyanoalkyl radicals containing a $C_2$-$C_4$ alkyl moiety, or cyanoalkoxy radicals containing a $C_1$-$C_5$ alkoxy moiety.

Exemplary of the cyanoalkyl radicals, representative are cyanoethyl, cyanopropyl and cyanobutyl radicals, and cyanoethoxy and cyanopropoxy radicals are exemplary of the cyanoalkoxy radicals.

$R^4$ is a hydrogen atom or a halogenated or nonhalogenated $C_1$-$C_8$ hydrocarbon radical.

This radical includes, more especially, halogenated or nonhalogenated alkyl radicals, such as methyl, ethyl, propyl, butyl, hexyl and octyl radicals and halogenated or nonhalogenated monocyclic aryl radicals, such as phenyl, tolyl, chlorophenyl and dichlorophenyl radicals.

In addition, $R^4$ and $R^5$ may together form a cyclic $C_5$-$C_{12}$ hydrocarbon radical, substituted or unsubstituted by chloro, nitro or cyano radicals.

Exemplary of such ring members, representative are those of the formulae:

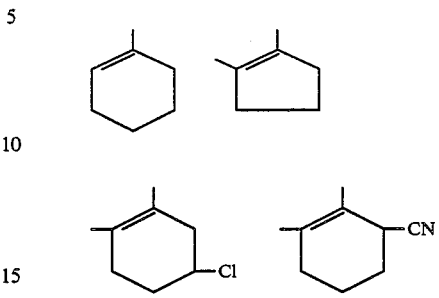

Diorganotin bis($\beta$-diketonate) is an organic tin derivative which is described in the chemical literature.

Various methods for the production thereof appear, in particular, in U.S. Pat. Nos. 3,055,845 and 4,517,337 and in published European Patent Application EP-A No. 147,323, in the text *Metal $\beta$-Diketonates And Allied Derivatives* by R. C. Mehrotra, R. Bohra and D. P. Gaur, published in 1978 by Academic Press, and in the text *The Chemistry Of Organotin Compounds* by R. C. Poller, published in 1970, also by Academic Press, said publications hereby being incorporated by reference.

Exemplary of such derivatives, representative are those of the formulae:

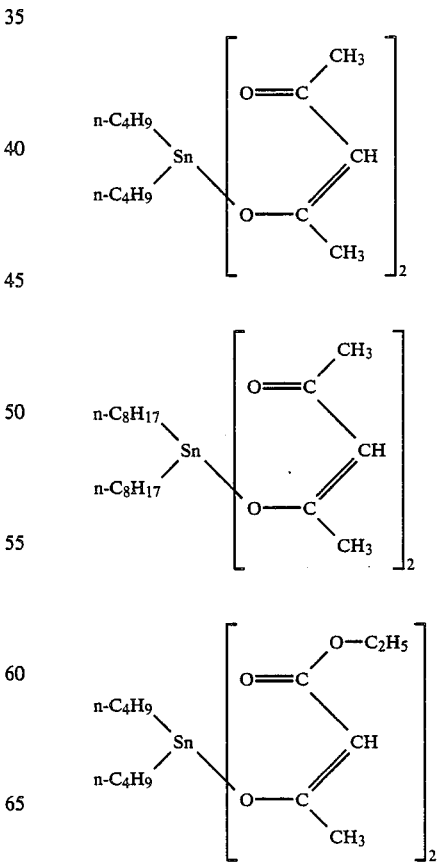

-continued

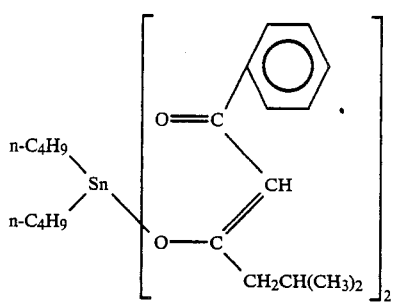

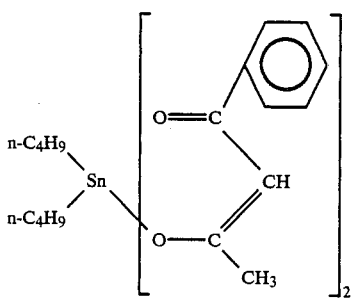

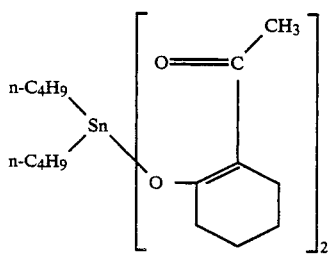

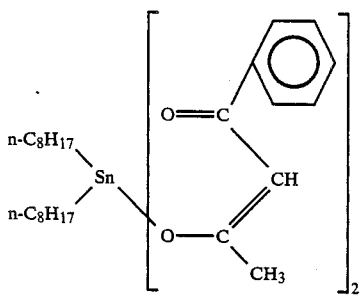

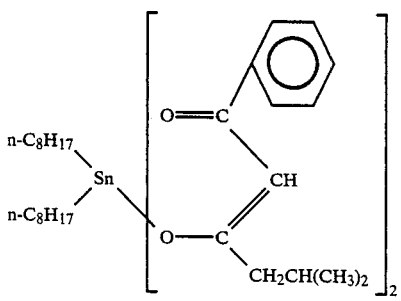

-continued

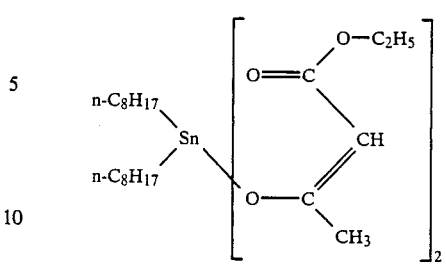

The organotin (IV) compound, free from any β-diketonato functional group, which is combined with the diorganotin bis(β-diketonate) is advantageously selected from among the compounds of the formulae: $A_2SnR^6{}_2$, $R^6{}_2SnO$, $AR^6{}_2SnOSnR^6{}_2A$,

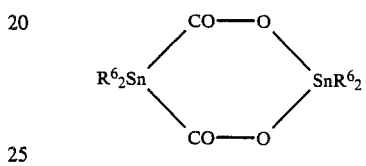

wherein the symbols $R^6$, which are identical or different, are each halogenated or nonhalogenated $C_1$–$C_{20}$ hydrocarbon radicals.

More especially, such hydrocarbon radicals include:
(i) halogenated or nonhalogenated, straight or branched chain $C_1$–$C_{20}$ alkyl radicals, such as methyl, ethyl, propyl, isopropyl, butyl, isobutyl, pentyl, hexyl, 2-ethylhexyl, octyl, nonyl, decyl, undecyl, dodecyl, tetradecyl, pentadecyl, hexadecyl, octadecyl, eicosyl, chloromethyl, 3,3,3-trifluoropropyl and 4,5-dichloropentyl radicals, (ii) $C_2$–$C_{18}$ alkenyl radicals, such as vinyl, allyl, 2-butenyl, 4-octenyl, undecenyl, pentadecenyl and that of the formula $CH_3(CH_2)_7CH=CH(CH_2)_7CH_2$, (iii) halogenated or nonhalogenated $C_4$–$C_{10}$ cycloalkyl radicals, such as cyclobutyl, cyclopentyl, cyclohexyl, methylcyclohexyl, dimethylcyclohexyl, cyclooctyl, chlorocyclohexyl and trifluoromethylcyclohexyl radicals, (iv) halogenated or nonhalogenated $C_4$–$C_{10}$ cycloalkenyl radicals, such as cyclopentenyl, cyclohexenyl, cyclooctenyl, 2,3-difluoro-1-cyclohexenyl, methyl-2-cyclohexenyl and butyl-2-cyclohexenyl radicals, (v) halogenated or nonhalogenated monocyclic $C_6$–$C_{15}$ aryl radicals, such as phenyl, tolyl, xylyl, ethylphenyl, propylphenyl, 2,3-diethylphenyl, chlorophenyl, dichlorophenyl, trichlorophenyl, pentafluorophenyl, trifluoromethylphenyl and 4,5-dichlorohexylphenyl radicals, and (vi) halogenated or nonhalogenated monocyclic $C_7$–$C_{15}$ arylalkyl radicals, such as benzyl, phenylethyl, phenylpropyl, phenylbutyl, tolylethyl, xylylbutyl, 2,4,5-trichlorophenylethyl and pentafluorophenylethyl radicals.

The symbols A, which are identical or different, are each organic and/or inorganic radicals, organosilicon radicals or a diorganopolysiloxane chain, all bonded to the tin atom via a Sn-O or Sn-S bond, halogen atoms, or hydroxyl radicals. In particular, these symbols represent:

(1) monocarboxylate radicals of the formula $R^7COO$, in which $R^7$ is a halogenated or nonhalogenated $C_1$-$C_{20}$ hydrocarbon; this may be the same as that represented by the symbol $R^6$. Thus, $R^7$ includes halogenated or nonhalogenated $C_1$-$C_{20}$ alkyl radicals, $C_2$-$C_{18}$ alkenyl radicals, halogenated or nonhalogenated $C_4$-$C_{10}$ cycloalkyl and cycloalkenyl radicals, and halogenated or nonhalogenated monocyclic $C_6$-$C_{15}$ aryl and arylalkyl radicals.

Specific examples of such radicals are the same as those given above for the radicals denoted by the symbol $R^6$;

(2) dicarboxylate radicals of the formula

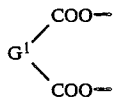

formed by coupling two $R^7COO$ radicals.

These dicarboxylate radicals bonded to the same tin atom or to two tin atoms result in the formulae:

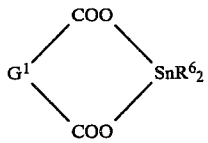

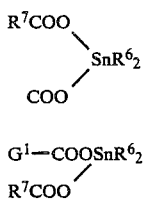

in which the symbol $G^1$ denotes a divalent $C_1$-$C_{15}$ hydrocarbon radical. More especially, such divalent radical includes:

(i) $C_1$-$C_{15}$ alkylene radicals, such as methylene, ethylene, propylene, butylene, 2-ethylhexylene, nonylene, dodecylene and pentadecylene radicals, (ii) $C_2$-$C_8$ alkenylene radicals, such as the radicals of the formulae:

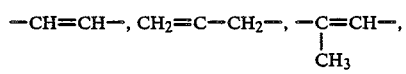

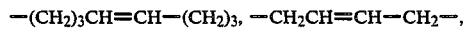

(iii) monocyclic $C_6$-$C_{12}$ arylene radicals, such as those of the formulae:

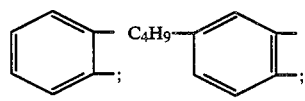

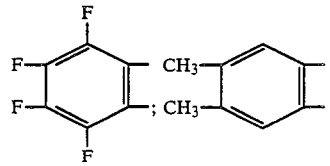

(3) dicarboxylate radicals of the formula:

$R^7OCOG^1COO$ in which the symbols $R^7$ and $G^1$ have the same meanings as the symbols $R^7$ and $G^1$ in the formulae $R^7COO$ and

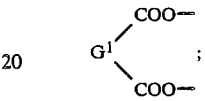

(4) alkoxy radicals of the formula $R^8O$, in which $R^8$ is a $C_1$-$C_8$ hydrocarbon radical. More especially, such radical includes:
 (i) $C_1$-$C_8$ alkyl radicals, such as methyl, ethyl, propyl, isopropyl, butyl, isobutyl, tert-butyl, secondary butyl, pentyl, 2-ethylhexyl and octyl radicals,
 (ii) monocyclic $C_6$-$C_{10}$ aryl radicals, such as phenyl, tolyl, xylyl and cumenyl radicals,
 (iii) monocyclic $C_7$-$C_{10}$ arylalkyl radicals, such as benzyl, 2-phenylethyl, 3-phenylpropyl and tolylethyl radicals;

(5) organodioxy radicals of the formula:

formed by coupling two $R^8O$ radicals, in in which the symbol $G^2$ represents a divalent $C_2$-$C_{10}$ hydrocarbon radical.

More especially, such radical includes:
 (i) $C_2$-$C_{10}$ alkylene radicals, such as ethylene, propylene, butylene, 2-ethylhexylene, decylene radicals and the radicals of the formulae —CH(CH$_3$)—CH(CH$_3$)— and —C(CH$_3$)$_2$—C(CH$_3$)$_2$—, and
 (ii) $C_5$-$C_{10}$ cycloalkylene radicals, such as those of the formulae:

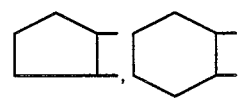

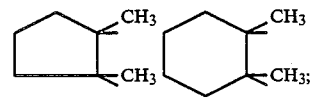

(6) polyether radicals of the formula —$OR^9(OR^{10})_cOR^{11}$ in which:

the symbol $R^9$ represents $C_1$-$C_5$ alkylene radicals, such as methylene, ethylene, propylene, butylene and pentylene radicals, or the radicals of the formulae —CH(CH$_3$)—CH$_2$— or —CH$_2$—CH(CH$_3$—CH$_2$—, the symbol $R^{10}$ represents $C_2$-$C_4$ alkylene radicals, such as ethylene, propylene or butylene radicals, or that of the formula —$CH_2$—$CH(CH_3)$—, the symbol $R^{11}$ represents $C_1$-$C_4$ alkyl radicals, such as methyl, ethyl, propyl or butyl radicals, or $C_2$-$C_5$ acyl radicals, such as acetyl, propionyl, butanoyl or pentanoyl radicals, and the symbol c represents O or an integer from 1 to 55 inclusive;

(7) ketiminoxy radicals of the formula

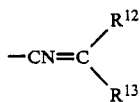

in which the symbols $R^{12}$ and $R^{13}$, which are identical or different, represent $C_1$-$C_{10}$ hydrocarbon radicals; more especially, such hydrocarbon radicals include:
(i) $C_1$-$C_8$ alkyl radicals, such as methyl, ethyl, propyl, isopropyl, butyl, 2-ethylhexyl and octyl radicals,
(ii) monocyclic $C_6$-$C_{10}$ aryl radicals, such as phenyl, tolyl, xylyl and cumenyl radicals,
(iii) monocyclic $C_7$-$C_{10}$ arylalkyl radicals, such as benzyl, phenylethyl and phenylpropyl radicals;

(8) alkylthio radicals of the formula $R^{14}S$, in which the symbol $R^{14}$ represents a $C_1$-$C_{10}$ hydrocarbon radical. In particular, this radical includes:
(i) $C_1$-$C_{10}$ alkyl radicals, such as methyl, ethyl, propyl, butyl, 2-ethylhexyl, octyl and decyl radicals, and
(ii) monocyclic $C_6$-$C_{10}$ aryl radicals, such as phenyl, tolyl, xylyl, cumenyl and mesityl radicals;

(9) organodithio radicals of the formula:

in which the symbol $G^2$ has the meaning of symbol $G^2$ in the formula

namely, a divalent $C_2$-$C_{10}$ hydrocarbon radical, including $C_2$-$C_{10}$ alkylene radicals and $C_5$-$C_{10}$ cycloalkylene radicals;

(10) thioglycolate radicals of the formula $R^{15}O$-$COCH_2$—S—, in which the symbol $R^{15}$ represents $C_1$-$C_{10}$ alkyl radicals, such as methyl, ethyl, propyl, butyl, pentyl, hexyl, octyl, isooctyl or decyl radicals;

(11) hydroxy radicals;

(12) halogen atoms, such as fluorine, chlorine or bromine atoms;

(13) nitrate, sulfate and carbonate radicals; and

(14) organosilicon radicals $R^7{}_3SiO_{0.5}$, or a short $R^7{}_3SiO$—$(R^7{}_2SiO$—$)_n$— diorganopolysiloxane chain, $R^7$ having the meaning given for the formula $R^7COO$—, and $R^7$ is preferably a methyl radical.

The symbols Q, which are identical or different, represent $C_2$-$C_{10}$ alkylene radicals, such as ethylene, propylene, butylene, pentylene, hexylene, 2-ethylhexylene, octylene or decylene radicals.

In one preferred embodiment of the invention, the organic derivative of tin of valency IV, which is free from any β-diketonato group, is selected from those of the formulae:

$A_2SnR^6{}_2$ and $R^6{}_2SnO$.

The preferred radicals $R^6$ are alkyl radicals and more particularly butyl, 2-ethylhexyl and n-octyl radicals.

The preferred radicals A are the radicals (1), (4), (7) and (14) described above and more particularly the radicals (1).

The preferred organic tin derivatives which are devoid of any β-diketenato group are di-n-butyltin dilaurate, di-n-octyltin dilaurate, di-n-butyltin diacetate, di-n-octyltin diacetate, di-n-butyltin di-2-ethylhexanoate, di-n-octyltin di-2-ethylhexanoate, di-n-butyltin diversatate and di-n-octyltin diversatate.

Exemplary of the compounds of the formula $A_2SnR^6{}_2$, representative are those of the following formulae:

A = Carboxylate radicals:

$(CH_3COO)_2Sn(CH_3)_2$,
$(CH_3COO)_2Sn(n$—$C_4H_9)_2$,
$(CH_3COO)_2Sn(n$-$C_8H_{17})_2$,
$[CH_3(CH_2)_8COO]_2Sn(CH_3)_2$,
$[CH_3(CH_2)_3CH(C_2H_5)COO]_2Sn(CH_3)_2$,
$(CH_3COO)_2Sn(CH_2C_6H_5)_2$,
$[CH_3(CH_2)_3CH(C_2H_5)COO]_2Sn(n$-$C_4H_9)_2$,
$[CH_3(CH_2)_{14}COO]_2Sn(n$-$C_4H_9)_2$,
$[CH_3(CH_2)_3CH(C_2H_5)COO]_2Sn(n$-$C_8H_{17})_2$,
$[CH_3(CH_2)_7CH$=$CH(CH_2)_7COO]_2Sn(n$-$C_4H_9)_2$,
$[CH_3(CH_2)_{12}COO]_2Sn(C_2H_5)_2$,
$[CH_3(CH_2)_{10}COO]Sn(n$-$C_4H_9)_2$,
$[CH_3(CH_2)_{10}COO]_2Sn(n$-$C_8H_{17})_2$.

The dialkyltin versatates described in British Pat. No. 1,289,900.

A = Dicarboxylate radicals:

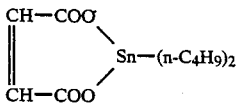 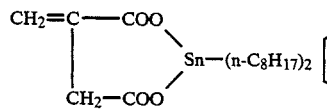 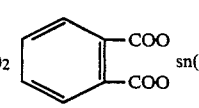 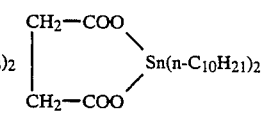

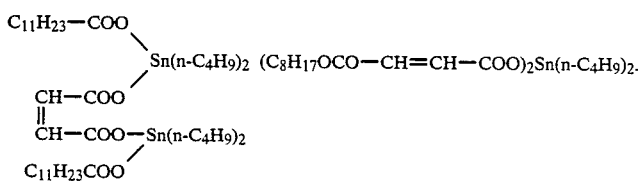

-continued

A = Alkoxy radicals:

$(CH_3O)_2Sn(n-C_4H_9)_2$, $(C_4H_9O)_2Sn(n-C_4H_9)_2$, $(C_2H_5O)_2Sn(n-C_4H_9)_2$,

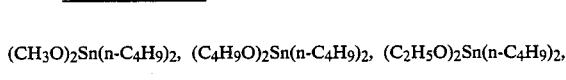
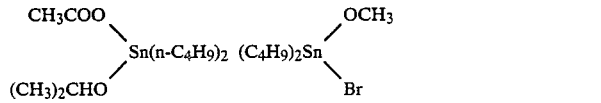

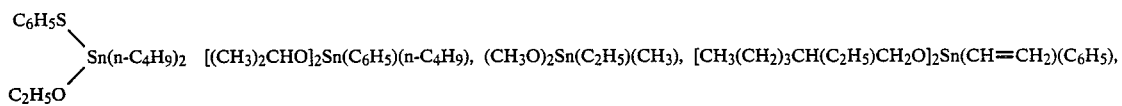
$[(CH_3)_2CHO]_2Sn(C_6H_5)(n-C_4H_9)$, $(CH_3O)_2Sn(C_2H_5)(CH_3)$, $[CH_3(CH_2)_3CH(C_2H_5)CH_2O]_2Sn(CH=CH_2)(C_6H_5)$, A = Organodioxy radicals:

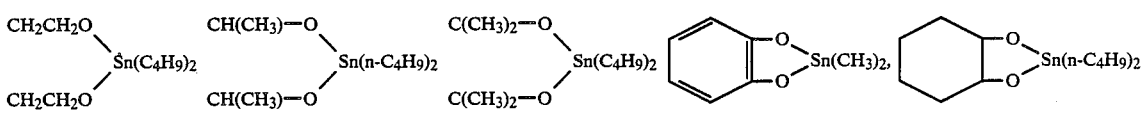

A = Polyether radicals:

$(CH_3)_2Sn(OCH_2CH_2OCH_3)_2$, $(C_2H_5)_2Sn[OCH_2—CH(CH_3(OCH_3)]_2$, $(C_4H_9)_2Sn[O(CH_2)_3(OCH_2CH_2)_5OC_2H_5](OC_2H_5)$,
$(C_8H_{17})_2Sn[O(CH_2)_3(OCH_2CH_2)_3(OCH_2CH(CH_3))_3OCOCH_3](OCOCH_3)$,

A = Ketiminoxy radicals:

$(C_8H_{17})_2Sn[ON=C—(CH_3)C_2H_5]_2$, $(n-C_4H_9)_2Sn[ON=C(CH_3)_2]_2$, $(CH_3)_2Sn[ON=C(CH_3)(C_6H_5)]_2$ $(n-C_4H_9)_2Sn[ON=C(CH_3)_2](OC_2H_5)$,

A = Alkylthio radicals:
$(CH_3)_2Sn(SCH_3)_2$, $(CH_3)_2Sn(SC_4H_9)_2$, $(C_6H_5)_2Sn(SC_6H_5)_2$, A = Organodithio radicals:

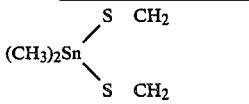

A = Thioglycolate radicals:
$(C_8H_{17}OCOCH_2—S)_2Sn(C_4H_9)_2$

A = Hydroxyl radicals:
$(C_3H_7)_2Sn(OH)NO_3$

A = Halogen atoms:
$(C_2H_5)_2SnF_2$, $(tertio-C_4H_9)_2SnCl_2$, $(iso-C_3H_7)_2SnBr_2$, $(CH_2=CH)_2SnCl_2$, $(CH_3CCl=CH—CH_2)_2SnCl_2$,
$(C_4H_9)(C_6H_5)SnCl_2$, $C_6H_5(CH_2=CH)SnCl_2$, A = Nitrate, sulfate and carbonate radicals:
$(CH_3)_2Sn(NO_3)_2$, $(CH_3)_2SnSO_4$, $(C_4H_9)_2Sn(CO_3)_2$, Exemplary of the compounds of the formulae:

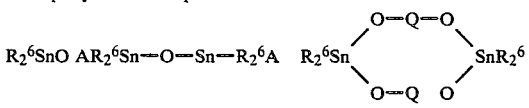

representative are the following:
$(C_2H_5)_2SnO$, $(CH_3)_2SnO$, $(C_6H_5)_2SnO$, $(C_4H_9)_2SnO$, $C_6H_5O(C_4H_9)_2Sn—O—Sn(C_4H_9)_2(OC_6H_5)$, $Cl(C_4H_9)_2Sn—O—Sn(C_4H_9)_2Cl$, $Cl(CH_3)_2Sn—O—Sn(CH_3)_2Cl$,

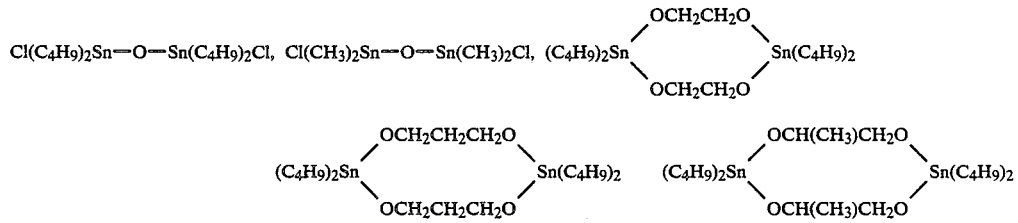

The preparation of these organic tin derivatives is known and appears, in particular, in aforementioned text, *The Chemistry Of Organotin Compounds* by R. C. Poller, published in 1970 by Academic Press, in the three-volume work "Organotin compounds", edited by Albert K. Sawyer and published in 1972 by Marcel Dekker, and in the collective work edited by A. Seyferth and R. B. King, published by Elsevier Scientific Publishing Company, a collection entitled *Organometallic Chemistry Reviews*, "Annual Surveys: Silicon—Germanium—Tin—Lead".

The formulation of the mixture of diorganotin bis-(β-diketonate), hereinafter designated a chelated derivative, with the organic tin (IV) derivative devoid of any β-diketonate functional group, hereinafter designated a nonchelated derivative, may be carried out at ambient temperature, by merely incorporating one of the compounds in the other. This is preferably done in the absence of moisture. The entire mixture is stirred for a few minutes to homogenize the liquid mass. This method is used when both tin derivatives are liquid.

In the case where two derivatives are used, one being solid and the other liquid, it may be necessary to slightly heat the mixture to about 40°–80° C. to dissolve the solid derivative.

In the case where two solid derivatives are used, heating is necessary, at least to the melting temperature of one of the two tin derivatives.

The respective amounts of the two components constituting the mixture are (in percentages by weight based on the combination of both tin derivatives) 0.1 to 99.9%, preferably 1 to 99%, of the chelated derivatives, and 99.9 to 0.1%, preferably 99 to 1%, of the nonchelated derivative, and still more preferably 90 to 10%.

The final catalyst mixture is stable when stored at ambient temperature in a closed container. It is used to permit or promote the curing of organopolysiloxane base compositions into silicone elastomers at ambient temperature and temperatures above ambient.

These base compositions are well known to this art and are employed, frequently after catalysis by a metal derivative of a carboxylic acid, for the manufacture of seals, of water-repellent coatings, molds, coating materials, for bonding and assembling a very wide variety of materials, for coating organic and inorganic fibers, etc.

These base compositions may be of the single-component type, that is to say, stable in storage in the absence of moisture and capable of being cured in the presence of moisture, in particular of moisture provided by the surrounding air or by water generated within the base when it is used.

Base compositions of this type may be prepared by mixing:

($A^1$) 100 parts by weight of an $\alpha,\omega$-dihydroxydiorganopolysiloxane polymer having a viscosity of 700 to 1,000,000 mPa.s at 25° C., comprising a sequence of diorganosiloxy recurring units of the formula $T_2SiO$ in which the symbols T, which are identical or different, represent hydrocarbon radicals containing from 1 to 10 carbon atoms, either unsubstituted or substituted by halogen atoms or cyano groups;

($B^1$) 0.5 to 20 parts by weight of a crosslinking agent selected from among organosilicon compounds containing more than two hydrolyzable radicals bonded to the silicon atoms, per molecule;

($C^1$) 0 to 250 parts by weight of inorganic fillers; and ($D^1$) 0 to 20 parts by weight of an adhesion promoter.

The $\alpha,\omega$-dihydroxydiorganopolysiloxane polymers having a viscosity of 700 to 1,000,000 mPa.s at 25° C., preferably 1,000 to 700,000 mPa.s at 25° C., are advantageously linear polymers consisting essentially of diorganosiloxy recurring units of the above-mentioned formula $T_2SiO$, and blocked by a hydroxyl group at each end of their polymer chain; however, the presence of monoorganosiloxy recurring units of the formula $TSiO_{1.5}$ and/or of siloxy recurring units of the formula $SiO_2$ is not excluded, in a proportion not exceeding 2% based on the number of diorganosiloxy recurring units.

The hydrocarbon radicals containing from 1 to 10 carbon atoms, whether unsubstituted or substituted by halogen atoms or cyano groups, denoted by the symbols T, include:

(i) alkyl and haloalkyl radicals containing from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl and 3,3,4,4,4-pentafluorobutyl radicals, (ii) cycloalkyl and halocycloalkyl radicals containing from 1 to 10 carbon atoms, such as cyclopentyl, cyclohexyl, methylcyclohexyl, propylcyclohexyl, 2,3-difluorocyclobutyl and 3,4-difluoro-5-methylcycloheptyl radicals, (iii) alkenyl radicals containing from 2 to 4 carbon atoms, such as vinyl, allyl and 2-butenyl radicals, (iv) monocyclic aryl and haloaryl radicals containing from 6 to 10 carbon atoms, such as phenyl, tolyl, xylyl, chlorophenyl, dichlorophenyl and trichlorophenyl radicals, and (v) cyanoalkyl radicals in which the alkyl moieties contain from 2 to 3 carbon atoms, such as $\beta$-cyanoethyl and $\gamma$-cyanopropyl radicals. Methyl, phenyl, vinyl and 3,3,3-trifluoropropyl radicals are the preferred radicals.

Exemplary of the recurring units of the formula $T_2SiO$, representative are those of the formulae:
$(CH_3)SiO$,
$CH_3(CH_2=CH)SiO$,
$CH_3(C_6H_5)SiO$,
$(C_6H_5)_2SiO$,
$CF_3CH_2CH_2(CH_3)SiO$,
$NC-CH_2CH_2(CH_3)SiO$,
$NC-CH(CH_3)CH_2(CH_2=CH)SiO$,
$NC-CH_2CH_2CH_2(C_6H_5)SiO$.

It will be appreciated that the polymer ($A^1$) may be a mixture of $\alpha,\omega$-dihydroxydiorganopolysiloxane polymers which differ from each other in molecular weight and/or in the nature of the groups bonded to the silicon atoms.

These $\alpha,\omega$-dihydroxydiorganopolysiloxane polymers ($A^1$) are commercially available; in addition, they can be readily prepared using methods which are well known to this art.

The crosslinking agents ($B^1$) are present in a proportion of 0.5 to 20 parts, preferably 1 to 18 parts, per 100 parts of $\alpha,\omega$-dihydroxydiorganopolysiloxane polymers ($A^1$). They are organosilicon compounds containing more than two hydrolyzable radicals bonded to the silicon atoms, per molecule.

Exemplary of suitable hydrolyzable radicals, representative are N-substituted amino, N-substituted amido, N,N-disubstituted aminoxy, ketiminoxy, aldiminoxy, alkoxy, alkoxyalkyleneoxy, enoxy and acyloxy radicals.

Preferably, the crosslinking agent has the general formula:

in which:

the symbol Y represents a $C_1$–$C_{10}$ hydrocarbon radical, whether unsubstituted or substituted by halogen atoms or cyano groups, the symbols Z, which are identical or different, represent hydrolyzable radicals selected from among those of the formulae:

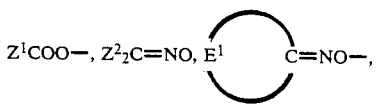

-continued

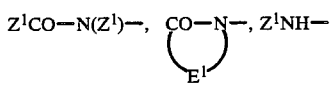

in which the symbols $Z^1$, which are identical or different, represent $C_1$–$C_{15}$ hydrocarbon radicals, the symbols $Z^2$, which are identical or different, represent $C_1$–$C_8$ hydrocarbon radicals, and the symbol $E^1$ represents a $C_4$–$C_8$ alkylene radical, the symbols W, which are identical or different, represent alkoxy radicals of the formulae $Z^3O$ and $Z^3O$-$E^2O$, in which the symbol $Z^3$ represents a $C_1$–$C_4$ alkyl radical and the symbol $E^2$ a $C_2$–$C_4$ alkylene radical, the symbol f represents zero or one, and the symbol g represents zero, 1 or 2.

The symbol Y may have the same meaning as the symbol T in the aforementioned recurring units of the formula $T_2SiO$; thus, the illustration given for T is also applicable to Y.

The symbols $Z^1$ represent $C_1$–$C_{15}$ hydrocarbon radicals which include:

(i) $C_1$–$C_{15}$ alkyl radicals, such as methyl, ethyl, propyl, 2-ethylhexyl, octyl, decyl, dodecyl or pentadecyl radicals, (ii) $C_5$–$C_{10}$ cycloalkyl radicals, such as cyclopentyl, cyclohexyl, methylcyclohexyl, dimethylcyclohexyl, propylcyclohexyl and cycloheptyl radicals, (iii) monocyclic $C_6$–$C_{10}$ aryl radicals, such as phenyl, tolyl or xylyl radicals, and (iv) $C_2$–$C_{15}$ alkenyl radicals, such as octenyl, undecenyl or tetradecenyl radicals.

The symbols $Z^2$ represent $C_1$–$C_8$ hydrocarbon radicals which include, in particular:

(i) $C_1$–$C_8$ alkyl radicals, such as methyl, ethyl, propyl, isopropyl, butyl, isobutyl, 2-ethylhexyl or octyl radicals, (ii) $C_5$–$C_8$ cycloalkyl radicals, such as cyclopentyl, cyclohexyl or methylcyclohexyl radicals, and (iii) monocyclic $C_6$–$C_8$ aryl radicals, such as phenyl, tolyl or xylyl radicals.

The symbol $Z^3$ represents a $C_1$–$C_4$ alkyl radical, such as the methyl, ethyl, propyl or butyl radical.

The symbol $E^1$ represents a $C_4$–$C_8$ alkylene radical which may correspond to the formulae: $(CH_2)_4$, $(CH_2)_5$, $(CH_2)_6$, $(CH_2)_7$, $-CH_2-CH(C_2H_5)(CH_2)_3-$ and $-CH_2-CH_2$, $-(CH_3)CH_2CH_2-$.

The symbol $E^2$ represents a $C_2$–$C_4$ alkylene radical which may correspond to the formulae: $(CH_2)_2$, $-CH(CH_3)-CH_2-$ $CH(CH_3)CH_2CH_2-$ and $-CH(CH_3)-CH(CH_3)-$.

The crosslinking agents $B^1$ of formula $Y_fSiW_gZ_{4-f-g}$ are used in the preparation of commercial single-component organopolysiloxane compositions, and are widely described in the chemical literature.

By way of example, there are mentioned below:

(1) silanes corresponding to the formula $Y_fSiZ_{4-f}$ which follows from the preceding formula when g=zero, and (2) patents which describe these: $Z=Z^1COO-$:
$CH_3Si(OCOCH_3)_3$, $C_2H_5Si(OCOCH_3)_3$, $CH_2=CHSi(OCOCH_3)_3$, $C_6H_5Si(OCOCH_3)_3$, $CH_3Si[OCOCH(C_2H_5)(CH_2)_3-CH_3]_3$, $CF_3CH_2CH_2Si(OCOC_6H_5)_3$, $CH_3Si(OCOC_6H_5)_3$, $CH_3Si(OCOCH_3)_2OCOCH(C_2H_5)(CH_2)_3CH_3$, $CH_3COOSi[OCOCH(C_2H_5)(CH_2)_3CH_3]_3$,

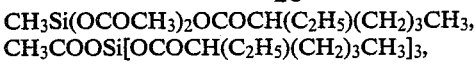

French Pat. Nos. 1,198,749, 1,220,348, 2,464,288.

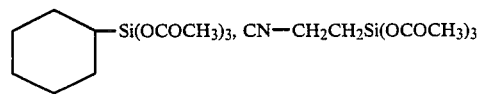

$CH_3Si[ON=C(CH_3)_2]_3$, $CH_3Si[ON=C(CH_3)C_2H_5]_3$, $CH_2=CHSi[ON=C(CH_3)C_2H_5]_3$, $C_6H_5Si[ON=C(CH_3)_2]_3$, $CH_3Si[ON=C(C_2H_5)(CH_2)_3CH_3]_3$, $CH_3Si[ON=C(CH_3)CH_2CH(C_2H_5)(CH_2)_3CH_3]_2$, $(CH_3)_2C=NOSi[ON=C(CH_3)C_2H_5]_3$,

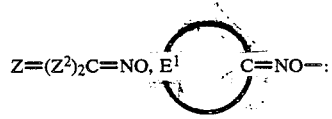

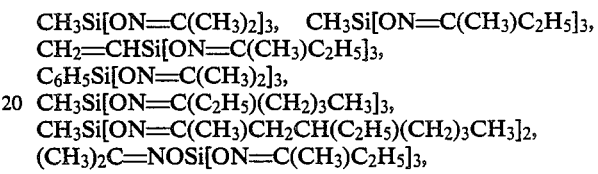

French Pat. Nos. 1,314,649, 1,371,250, 2,074,144.
$Z=Z^1CON(Z^1)-$ or

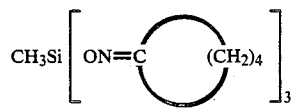

$CH_3Si[N(CH_3)COCH_3]_3$, $CH_3Si[N(C_6H_5)COCH_3]_3$, $CF_3CH_2CH_2Si[N(C_6H_5)COCH_3]_3$, $CH_2=CH-Si[N(CH_3)COC_6H_5]_3$,

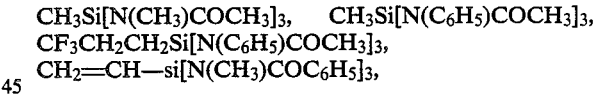

French Pat. Nos. 1,423,477, 2,201,326. $Z=Z^1NH-$:

$CH_3Si-(NH\ n-C_4H_9)_3$

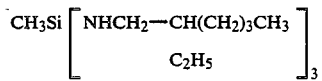

$C_6H_5Si(NH\ iso.C_4H_9)_3$

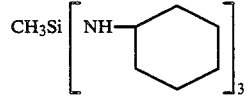

$CH_2=CHSi(NH\ iso.C_4H_9)_3$

French Pat. Nos. 1,248,826, 1,510,778, 2,201,327.
Z=Z¹NH and (Z²)₂C=NO—:

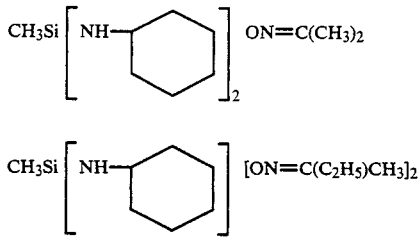

CH₂=CHSi(NH n-C₄H₉)₂[ON=(C₂H₅)CH₃]

Noted below, by way of examples, are: (1) silanes corresponding to the formula $Y_fSiW_gZ_{4-f-g}$ in which g denotes 1 or 2.
Z=Z¹COO—:
W=Z³O— and Z³OE²O—:
CH₃Si(OCH₃)(OCOCH₃)₂,

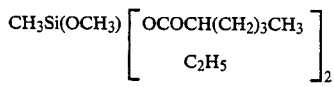

CH₂=CHSi(OCH₂CH₂OCH₃)(OCOCH₃)₂,
(CH₃)₃COSi(OCOCH₃)₃,

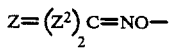

W=Z³O and Z³OE²O—:
CH₃Si(OC₂H₅)[ON=C(CH₃)₂]₂,
CH₃Si(OCH₂CH₂OCH₃)[ON=C(CH₃)₂]₂,
CH₃Si(OCH₂CH₂OCH₃)₂[ON=C(CH₃)C₂H₅]
Z=Z¹CON(Z¹)—and

W=Z³O—:
CH₃Si(OCH₃)[N(CH₃)COCH₃]₂,
CH₃Si(OC₂H₅)([N(CH₃)COC₆H₅]₂,
CH₃Si(OC₂H₅)₂[N(CH₃)COC₆H₅],

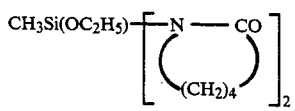

Z=Z¹NH— and Z¹COO—:
W=Z³O—:
(C₂H₅O)₂Si(OCOCH₃)[NHCH(CH₃)₂]

These mixed silanes are described, more particularly, in French patent of first addition No. 90,695 to French Pat. No. 1,423,477, and in French Pat. Nos. 1,439,025, 1,541,542, 1,541,543 and 2,067,636.

The inorganic fillers (C¹) are used in a proportion of 0 to 250 parts, preferably 5 to 200 parts, per 100 parts of the α,ω-dihydroxydiorganopolysiloxane polymers (A¹).

These fillers may be in the form of very finely divided materials whose mean particle diameter is less than 0.1 micrometer. These fillers include pyrogenic silicas and precipitated silicas; their BET specific surface area is generally greater than 40 m²/g.

These fillers may also be in the form of more coarsely divided materials, with a mean particle diameter greater than 0.1 micrometer. As examples of such fillers, representative are ground quartz, diatomaceous silicas, calcium carbonate, calcined clay, rutile-type titanium oxide, iron, zinc, chromium, zirconium and magnesium oxides, the various forms of alumina (hydrated or otherwise), boron nitride, lithopone, barium metaborate, barium sulfate and ballotini; their specific surface area is generally less than 30 m²/g.

The surfaces of these fillers (C¹) may have been modified by being treated with the various organosilicon compounds usually employed for this purpose. Thus, such organosilicon compounds may be organochlorosilanes, diorganocyclopolysiloxanes, hexaorganodisiloxanes, hexaorganodisilazanes or diorganocyclopolysilazanes (French Pat. Nos. 1,126,884, 1,136,885, 1,236,505; British Pat. No. 1,024,234). In the majority of cases, the treated fillers contain from 3 to 30% of their weight as organosilicon compounds.

The fillers (C¹) may be a mixture of several types of fillers of different particle size distribution; thus, they may include 30 to 70% of finely divided silicas having a BET specific surface area of more than 40 m²/g and 70 to 30% of more coarsely divided silicas having a specific surface area of less than 30 m²/g.

An adhesion promoter (D¹) may also be added, in a proportion of 0 to 20 parts, preferably 0.2 to 15 parts, per 100 parts of the α,ω-dihydroxydiorganopolysiloxane oils (A¹). This agent is preferably selected from among organosilicon compounds which at the same time contain (1) organic groups substituted by radicals selected from among amino, ureido, isocyanato, epoxy, alkenyl, isocyanurate, hydantoyl and mercapto ester radicals, and (2) hydrolyzable groups bonded to the silicon atoms.

By way of illustration, exemplary organosilicon compounds are those having the following formula (including the patents describing same):

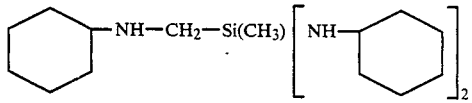

European Application No. 74,001

NH₂CH₂CH₂NH—CH₂CH(CH₃)COO(CH₂)₃Si(OCH₃)₃
German Application No. 3,304,182

[(CH₃)₃CO]₂Si(OCOCH₃)₂
U.S. Pat. No. 4,356,116

CHCOO(CH₂)₃Si(OCH₃)₃
‖
CHCOO(CH₂)₃Si(OCOCH₃)₃
U.S. Pat. No. 4,273,698

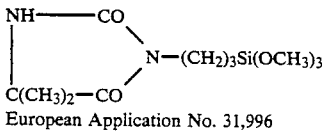

European Application No. 31,996

(C₂H₅O)₃Si(CH₂)₃NHCO—CH=CH—COOH
U.S. Pat. No. 4,466,739

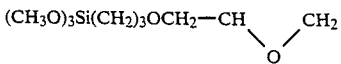

-continued
U.S. Pat. No. 4,115,356

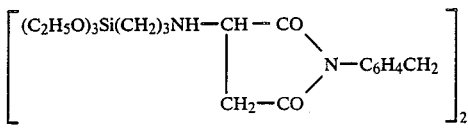

French Patent No. 2,259,833

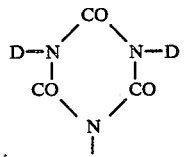

D = (CH$_2$)$_3$Si(OCH$_3$)$_3$
U.S. Pat. No. 3,517,001

(C$_2$H$_5$O)$_3$Si(CH$_2$)$_3$NH$_2$
(CH$_3$O)$_3$Si(CH$_2$)$_3$NH—CH$_2$CH$_2$NH$_2$

Other single-component base compositions may be prepared by mixing:

(A$^2$): 100 parts of an α,ω-dihydroxydiorganopolysiloxane polymer having a viscosity of 700 to 1,000,000 of mPa.s at 25° C., (B$^1$): 0.5 to 20 parts of a polyalkoxysilane of the formula M$_h$SiW$_{4-h}$, in which:

the symbol M represents a halogenated or non-halogenated C$_1$–C$_{10}$ hydrocarbon radical, the symbols W, which are identical or different, represent alkoxy or polyalkoxy radicals of the formulae Z$^3$O and Z$^3$OE$^2$, in which the symbol Z$^3$ represents a C$_1$–C$_4$ alkyl radical, and the symbol E a C$_2$–C$_4$ alkylene radical, and the symbol h is 0 or 1, (C$^2$): 0 to 250 parts of inorganic fillers, and (D$^2$): 0.5 to 15 parts of a compound selected from among:

1. primary or secondary organic amines which have a pK$_b$ of less than 5 in an aqueous medium, aminoorganosilanes and aminoorganopolysiloxanes containing, per molecule, (i) at least one C$_1$–C$_{15}$ organic group bonded to the silicon atom via a Si-C bond and substituted by at least one amino radical and (ii) at least one C$_1$–C$_{15}$ alkoxy or C$_3$–C$_6$ alkoxyalkylenoxy radical, 2. organic titanium and zirconium derivatives containing organoxy and/or β-diketonato groups.

The α,ω-dihydroxydiorganopolysiloxane polymer (A$^2$) are similar to the α,ω-dihydroxydiorganopolysiloxane polymer (A$^1$) described above. Such polymers are preferably those having a viscosity of 1,000 to 500,00 mPa.s at 25° C., in which at least 80% of the radicals bonded to the silicon atoms are methyl radicals.

From 0.5 to 20 parts, preferably 1 to 18 parts of a polyalkoxysilane of above-mentioned formula M$_h$SiW$_{4-h}$ are used per 100 parts of this polymer. The symbol M in this formula represents a halogenated or non-halogenated C$_1$–C$_{10}$ hydrocarbon radical which includes, more particularly:

(i) C$_1$–C$_5$ alkyl radicals, such as methyl, ethyl, propyl, isopropyl, butyl, isobutyl, tert-butyl, n-pentyl, isopentyl and 3,3,3-trifluoropropyl radicals, (ii) C$_2$–C$_4$ alkenyl radicals, such as vinyl, allyl or 2-butenyl radicals, (iii) C$_5$–C$_8$ cycloalkyl radicals, such as cyclopentyl, cyclohexyl or methylcyclohexyl radicals, and (iv) the monocyclic C$_6$–C$_{10}$ aryl radicals, such as phenyl, tolyl, xylyl or chlorophenyl radicals.

The symbols W, which are identical or different, have the same meaning of the symbols W in the formula (Y)$_f$SiW$_g$(Z)$_{4-f-g}$, described above. Accordingly, they represent alkoxy or polyalkoxy radicals of the formulae: Z$^3$O and Z$^3$OE$^2$O, in which the symbol Z$^3$ represents a C$_1$–C$_4$ alkyl radical, such as the methyl, ethyl, propyl or butyl radical, and the symbol E$^2$ a C$_2$–C$_4$ alkylene radical capable of corresponding to the formulae: (CH$_2$)$_2$, —CH(CH$_3$)CH$_2$— or —CH(CH$_3$)CH(CH$_3$)—.

As specific examples of the polyalkoxysilanes of the formula (B$^2$)M$_h$SiW$_{4-h}$, representative are those of the formulae:

Si(OCH$_3$)$_4$,
CH$_3$Si(OCH$_3$)$_3$,
CH$_3$Si(OCH$_2$CH$_2$OCH$_3$)$_3$,
CH$_3$Si(OCH$_2$CH$_2$CH$_3$)$_3$Si(OCH$_2$CH$_2$OCH$_3$)$_4$,
CH$_2$=CHSi(OCH$_2$CH$_2$OCH$_3$)$_3$,
C$_6$H$_5$Si(OCH$_3$)$_3$,
C$_6$H$_5$Si(OCH$_2$CH$_2$OCH$_3$)$_3$,
Si(OCH$_3$)$_2$[OCH(CH$_3$)CH$_2$OCH$_3$]$_2$,
CH$_2$=CHSi(OCH$_3$)$_3$,
CH$_2$=CHSi(OCH$_2$CH$_2$OCH$_2$CH$_3$)$_3$,
CH$_2$=CH—CH$_2$Si(OCH$_3$)$_3$,
CH$_2$=C(CH$_3$)CH$_2$Si(OCH$_3$)$_3$,
CH$_2$=CH—Si(OCH$_3$)$_2$[OCH(CH$_3$)CH$_2$OCH$_3$]

The inorganic fillers (C$^2$) are similar to the inorganic fillers (C$^1$) described above.

The compounds (D$^2$) are used in a proportion of 0.5 to 15 parts, preferably 0.8 to 13 parts, per 100 parts of α,ω-dihydroxydiorganopolysiloxane polymers (A$^2$). As above-indicated, they may be selected from among the primary or secondary organic amines which have a pK$_b$ of less than 5 in an aqueous medium. Such amines may be aliphatic, alicyclic, heterocyclic or arylaliphatic.

As specific examples of such aliphatic amines, representative are n-butylamine, amylamine, the amines of the formulae:

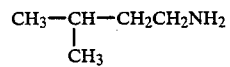

and

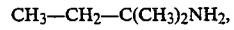

n-hexylamine, n-decylamine, laurylamine, hexadecylamine, n-octylamine, diisopropylamine, di-n-butylamine, diisobutylamine, di-n-hexylamine, ethylenediamine, propylenediamine, hexamethylenediamine, and polyamines of the formulae:

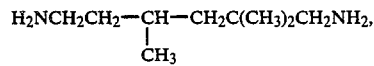

H(NHCH$_2$CH$_2$)$_2$NH$_2$,
H(HNCH$_2$CH$_2$)$_3$NH$_2$,
H$_2$NCH$_2$CH(NH$_2$)CH$_2$NH$_2$

As specific examples of such alicyclic amines, representative are cyclopentylamine, cyclohexylamine and the amines of the formulae:

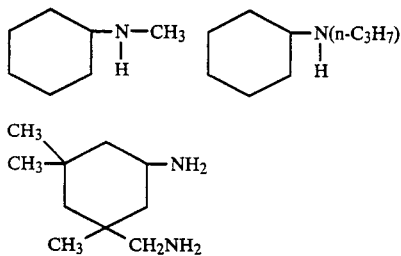

As specific examples of such heterocyclic amines, representative are piperidine, pyrrolidine, piperazine, and the amines of the formulae:

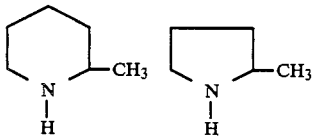

As specific examples of such arylaliphatic amines, representative are benzylamine and phenylethylamine.

All of the aforenoted organic amines are known compounds, as are various processes by which they are prepared; furthermore, many of them are commercially available on an industrial scale.

The compounds (D$^2$) may also be selected from among aminoorganosilanes and aminoorganopolysiloxanes containing, per molecule, (i) at least one $C_1$-$C_{15}$ organic group bonded to the silicon atom via a SiC bond and substituted by at least one amino radical, and (ii) at least one $C_1$-$C_5$ alkoxy or $C_3$-$C_6$ alkoxyalkylenoxy radical.

As specific examples of these organoaminosilanes, representative are those of the formulae given below, in which the organic group substituted by at least one amino radical is a hydrocarbon group:

$H_2N(CH_2)_3Si(OCH_2CH_2OCH_3)_3$,
$H_2N(CH_2)_3Si(OCH_3)_3$,
$H_2N(CH_2)_3Si(OC_2H_5)_3$,
$H_2N(CH_2)_4Si(OCH_3)_3$,
$H_2NCH_2CH(CH_3)CH_2CH_2SiCH_3(OCH_3)_2$,
$H_2HCH_2Si(OCH_3)_3$
$HN(n-C_4H_9)CH_2Si(OCH_3)_3$
$H_2N(CH_2)_2NH(CH_2)_3Si(OCH_3)_3$,
$H_2N(CH_2)_2NH(CH_2)_3Si(OCH_2CH_2OCH_3)_3$
$CH_3NH(CH_2)_2NH(CH_2)_3Si(OCH_3)_3$,
$H(NHCH_2CH_2NH(CH_2)_3Si(OCH_3)_3$, $$H_2N(CH_2)_2NH(CH_2)_3\underset{\underset{OCH(CH_3)CH_2OCH_3}{|}}{Si}(OCH_3)_2 \quad,$$

$H_2N(CH_3)_3Si(OCH_2CH_2OCH_2CH_3)_3$, $$H_2N(CH_2)_2NH(CH_2)_3\underset{\underset{(OCH_3)_2}{|}}{Si}CH=CH_2$$

The preparation of these silanes is described, more especially, in U.S. Pat. Nos. 2,754,311, 2,832,754, 2,930,809 and 2,971,864.

As specific examples of the organoaminosilanes, representative are those of the formulae given below, in which the organic group substituted by at least one amino radical is a hydrocarbon group containing ether or thioether linkages:

$H_2N(CH_2)_3O(CH_2)_3Si(OCH_2CH_2OCH_3)_3$,
$H_2N(CH_2)_3O(CH_2)_3Si(OCH_3)_3$,
$C_2H_5NH(CH_2)_3O(CH_2)_3Si(OCH_3)_3$,
$H_2N-CH_2-CH(CH_3)CH_2O(CH_2)_3SiC_6H_5(OCH_3)_2$,
$H_2N-CH_2CH_2NH(CH_2)_3O(CH_2)_3Si(OCH_3)_3$,
$H_2N(CH_2)_2S(CH_2)_3Si(OCH_2CH_2OCH_3)_3$,
$H_2N(CH_2)_2S(CH_2)_3Si(OCH_3)_3$,
$H(NHCH_2CH_2)_2S(CH_2)_3SiCH_3(OCH_3)_2$

The preparation of these silanes is described, in particular, in U.S. Pat. Nos. 3,341,563, 3,551,375, 3,598,853 and 3,488,373.

The aminoorganopolysiloxanes which can be used may be prepared by condensation of the above-mentioned aminoorganosilanes, and more particularly of the trialkoxyaminoorganosilanes, such as those of formulae:
$H_2N(CH_2)_3Si(OC_2H_5)_3$,
$H_2N(CH_2)_3Si(OCH_3)_3$,
$H_2N(CH_2)_2NH(CH_2)_3Si(OCH_3)_3$
with a dihydroxydiorganopolysiloxane polymer of the class of the above-mentioned polymers ($A^1$) and ($A^2$).

Aminoorganopolysiloxanes prepared according to this process are described, in particular, in U.S. Pat. No. 3,686,375, European Application No. 50,453 and French Pat. Nos. 1,381,590, 1,385,693 and 2,228,814.

As specific examples of these polymers, representative are those of the formulae:
$H_2N(CH_2)_3Si(OCH_3)_2[OSi(CH_3)_2]_nOSi(OCH_3)_2(CH_2)_3NH_2$
$H_2N(CH_2)_2NH(CH_2)_3Si(OCH_3)_2[OSi(CH_3)_2]_nOSi(OCH_3)_2(CH_2)_3NH-(CH_2)_2NH_2$
n=2 to 60.

The compounds (D$^2$) may also be organic titanium and zirconium derivatives containing organoxy and/or β-diketonato groups bonded to the silicon atoms.

As specific examples of organic titanium derivatives, representative are those of the formulae:

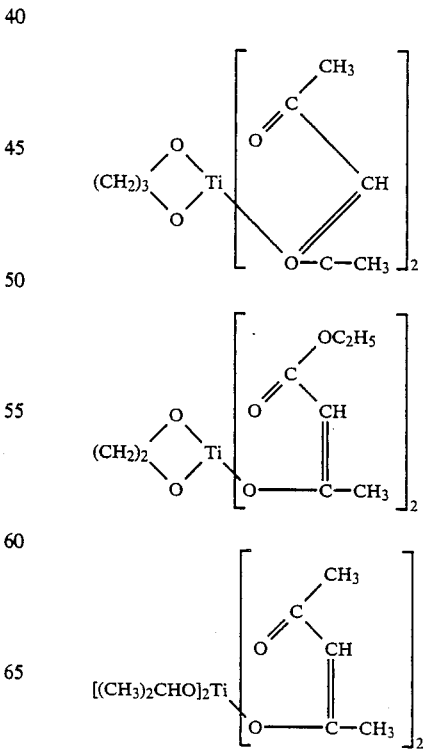

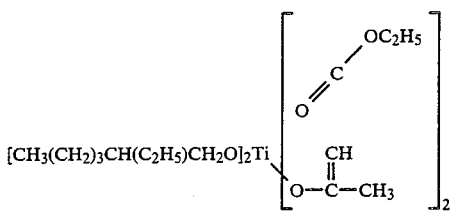

(n-C$_4$H$_9$O)$_4$Ti
(C$_2$H$_5$O)$_4$Ti
(CH$_3$)$_2$CHO$_4$Ti,
(n—C$_3$H$_7$O)$_4$Ti,
(n—C$_8$H$_{17}$O)$_4$Ti,
(CH$_3$CH$_2$OCH$_2$CH$_2$O)$_4$Ti
(CH$_3$OCH$_2$CH$_2$O)$_4$Ti
[CH$_3$(CH$_2$)$_3$CH(C$_2$H$_5$)CH$_2$O]$_4$Ti

These organic titanium derivatives are described, in particular, in French Pat. Nos. 1,330,625, 2,121,289 and 2,121,631.

As specific examples of organic zirconium derivatives, representative are those of the formulae:
(C$_2$H$_5$O)$_4$Zr
((CH$_3$)$_2$CHO)$_4$Zr
(n—C$_3$H$_7$O)$_4$Zr
(n—C$_4$H$_9$O)$_4$Zr
((CH$_3$)$_3$C—O)$_4$Zr
(CH$_3$OCH$_2$CH$_2$O)$_4$Zr
(n—C$_7$H$_{15}$O)$_4$Zr.

Other single-component base compositions may also be prepared by mixing:

(A$^3$): 100 parts of a diorganopolysiloxane polymer of the formula:

W$_{3-h}$M$_h$Si(OSiT$_2$)$_p$OSiM$_h$W$_{3-h}$ in which the symbols T, which are identical or different, represent hydrocarbon radicals containing from 1 to 10 carbon atoms which are either unsubstituted or substituted by halogen atoms or cyano groups, the symbols M, which are identical or different, represent halogenated or nonhalogenated C$_1$-C$_{10}$ hydrocarbon radicals, the symbols W, which are identical or different, represent alkoxy or polyalkoxy radicals of the formulae Z$^3$O, or Z$^3$OE$^2$O—, in which the symbol Z$^3$ represents a C$_1$-C$_4$ alkyl radical, the symbol E$^2$ a C$_2$-C$_4$ alkylene radical, the symbol h is zero or one and the symbol p represents a number whose value is sufficient to provide a viscosity of 700 to 1,000,000 mPa.s at 25° C., (B$^3$): 0 to 15 parts of a polyalkoxysilane of the formula M$_h$SiW$_{4-h}$, in which the symbols W, M and h have the meanings of the symbols W, M and h of the diorganopolysiloxane polymer (A$^3$), (C$^3$): 0 to 250 parts of inorganic fillers, and (D$^3$): 0 to 20 parts of compounds selected from among:

1. primary or secondary organic amines which have a pK$_b$ of less than 5 in aqueous medium, aminoorganosilanes, aminoorganopolysiloxanes and guanidinoorganosilanes containing, per molecule, both:
   (i) at least one C$_1$-C$_{15}$ organic group bonded to the silicon atom via a Si—C bond and substituted by at least one amino radical or a guanidino radical, and
   (ii) at least one C$_1$-C$_5$ alkoxy radical or a C$_3$-C$_6$ alkoxyalkylenoxy radical, or 2. organic titanium and zirconium derivatives containing organoxy and/or β-(diketonato) groups.

The diorganopolysiloxane polymer (A$^3$) is prepared by contacting an α,ω-dihydroxydiorganopolysiloxane polymer of the formula:

HO(T$_2$)Si(OSiT$_2$)$_{p-2}$OSi(T$_2$)OH with the polyalkoxysilane (B$^3$) of the formula M$_h$SiW$_{4-h}$ in a proportion of at least two moles of polyalkoxysilane per one mole of α,ω-dihydroxydiorganopolysiloxane polymer.

The reaction may be carried out in the presence of an organic amine (U.S. Pat. No. 3,542,901), an organic titanium derivative (U.S. Pat. No. 4,111,890) or an N,N-disubstituted hydroxylamine (French Pat. No. 2,508,467).

The symbol T in the formula of the polymer (A$^3$) has the meaning of the symbol T in the formula T$_2$SiO of the recurring units in the polymer (A$^1$), described above. The symbols M, W, Z$^3$ and E$^2$, which belong to the formula of the polymer (A$^3$) and to that of the polyalkoxysilane (B$^3$) have, respectively, the meaning of the symbols M, W, Z$^3$ and E$^2$ in the formula of the polyalkoxysilane (B$^2$), described above.

Consequently, representative examples which have already been given for the various radicals represented by the symbols in (B$^2$), also apply to the radicals represented by the symbols in (A$^3$) and in (B$^3$).

By way of illustration, the diorganopolysiloxane polymers (A$^3$) may be blocked at each end of their polymer chain by units of the formulae:
(CH$_3$O)$_2$CH$_3$SiO$_{0.5}$
(CH$_3$O)$_3$SiO$_{0.5}$
(CH$_3$OCH$_2$CH$_2$O)$_2$CH$_3$SiO$_{0.5}$
(CH$_3$CH$_2$OCH$_2$CH$_2$)$_2$CH$_2$CH$_3$SiO$_{0.5}$
(CH$_3$OCH$_2$CH$_2$O)$_3$SiO$_{0.5}$

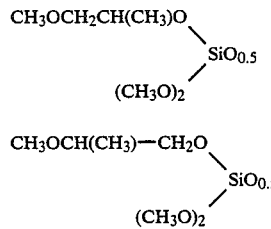

The recurring units in the polymer chain correspond, for example, to the formulae:
(CH$_3$)$_2$SiO
CH$_3$(CH$_2$=CH)SiO
(C$_6$H$_5$)$_2$SiO
CH$_3$(CF$_3$CH$_2$CH$_2$)SiO The polyalkoxysilane (B$^3$), used in a proportion of 0 to 15 parts per 100 parts of polymer (A$^3$), preferably 0.5 to 13 parts, is similar to the polyalkoxysilane (B$^2$); thus, the formulae mentioned as examples for (B$^2$) are also applicable to the polyalkoxysilane (B$^3$).

The inorganic fillers (C$^3$) are identical to the fillers (C$^1$), described above. They are used in a proportion of 0 to 250 parts, preferably 5 to 200 parts per 100 parts of polymer (A$^3$).

The compounds (D$^3$) are used in a proportion of 0 to 20 parts, preferably 2 to 18 parts per 100 parts of polymer (A$^3$). They include, in particular, primary and secondary organic amines, aminoorganosilanes, aminoorganopolysiloxanes and organic titanium and zirconium derivatives; these compounds are similar to the compounds (D$^2$) described above, and as a result the description given in the case of the compounds (D$^2$) is also applicable to the compounds (D$^3$). In addition, the compounds (D$^3$) include the guanidinoorganosilanes and guanidino organopolysiloxanes described, for example, in U.S. Pat. No. 4,180,642.

Exemplary of such guanidinoorganosilanes and siloxanes, representative are those of formulae:

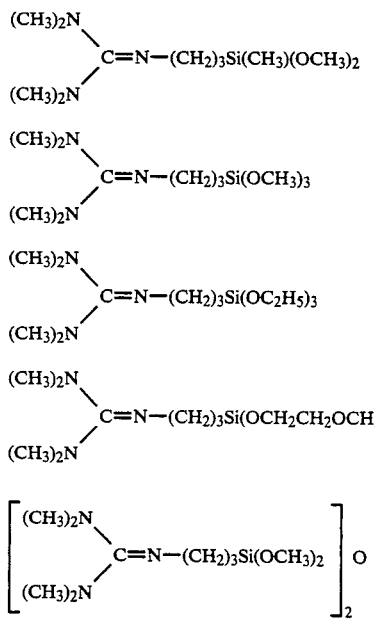

All three types of single-component base compositions immediately above described are catalyzed by the addition of the organic tin system according to the invention, obtained by mixing the chelated derivative with the nonchelated derivative. The amount of the organic tin system which is used per 100 parts of the base composition is on the order of 0.0001 to 5 parts, preferably 0.001 to 4.5 parts.

Apart from the single-component base compositions, it is possible to use two-component base compositions which cure as soon as the organic tin derivative has been incorporated. After the incorporation of the tin catalyst, they are packaged as two separate fractions, where one of the fractions contains, for example, only the tin catalyst or the latter mixed with the crosslinking agent.

These base compositions are produced by mixing:

(A$^4$): 100 parts of an α,ω-dihydroxydiorganopolysiloxane polymer having viscosity of 700 to 1,000,000 mPa.s at 25° C., (B$^4$): 1 to 20 parts of:
(i) a silane of the formula $(R^{17})_k Si(OR^{16})_{4-k}$, in which the symbols R$^{16}$, which are identical or different, represent C$_1$–C$_8$ alkyl radicals, C$_3$–C$_6$ alkoxyalkylene radicals, the symbol R$^{17}$ represents a C$_1$–C$_{10}$ hydrocarbon radical and the symbol k is zero or one, or
(ii) products of partial hydrolysis of the silane of the formula Si(OR$^{16}$)$_4$, in which the symbol R$^{16}$ has the meaning given under (i), and (C$^4$): 0 to 150 parts of inorganic fillers.

The α,ω-dihydroxydiorganopolysiloxane polymer (A$^4$) is similar to the α,ω-dihydroxydiorganopolysiloxane polymer (A$^1$) described above in connection with the preparation of single-component bases.

This polymer (A$^4$) has a viscosity of 700 to 1,000,000 mPa.s at 25° C., preferably 1,000 to 800,000 mPa.s at 25° C.; the organic radicals bonded to the silicon atoms are preferably methyl, ethyl, propyl, vinyl or phenyl radicals. Copolymers containing at least 80% of methyl radicals are generally selected.

The silane (B$^4$) of formula $R^{17}_k Si(OR^{16})_{4-k}$ is used in a proportion of 1 to 20 parts, preferably 2 to 15 parts per 100 parts of the polymers (A$^4$).

The symbols R$^{16}$ represent:
(i) C$_1$–C$_8$ alkyl radicals, such as methyl, ethyl, propyl, butyl, pentyl or 2-ethylhexyl radicals, or
(ii) C$_3$–C$_6$ alkoxyalkylene radicals, such as those of the formulae:
CH$_3$OCH$_2$CH$_2$—
CH$_3$OCH$_2$CH(CH$_3$)—
CH$_3$OCH(CH$_3$)CH$_2$—
C$_2$H$_5$OCH$_2$CH$_2$CH$_2$—

The symbol R$^{17}$ represents a C$_1$–C$_{10}$ hydrocarbon radical which includes:
(i) C$_1$–C$_{10}$ alkyl radicals, such as methyl, ethyl, propyl, butyl, pentyl, 2-ethylhexyl, octyl or decyl radicals,
(ii) vinyl or allyl radicals,
(iii) C$_5$–C$_8$ cycloalkyl radicals, such as cyclopentyl or cyclohexyl radicals, and
(iv) monocyclic C$_6$–C$_8$ aryl radicals, such as phenyl, tolyl or xylyl radicals.

The products of partial hydrolysis of the silane of the formula Si(OR$^{16}$)$_4$ consist essentially of recurring units of the formula (R$^{16}$O)$_2$SiO, the remaining recurring units having the formulae (R$^{16}$O)$_3$SiO$_{0.5}$, (R$^{16}$O)SiO$_{1.5}$ or SiO$_2$.

These products of partial hydrolysis, usually referred to as alkyl polysilicates, dissolve in the usual hydrocarbon solvents, such as toluene, xylene, cyclohexane or methylcyclohexane; the most commonly used product is ethyl polysilicate 40 which has a silica content of 40%, the value being obtained after total hydrolysis of the OC$_2$H$_5$ radicals.

As specific examples of silanes of formula $R^{17}_k Si(-RO^{16})_{4-k}$, representative are those of the formulae:
CH$_3$Si(OCH$_3$)$_3$
CH$_3$Si(OC$_2$H$_5$)$_3$
C$_2$H$_5$Si(OCH$_3$)$_3$
CH$_2$=CHSi(OCH$_3$)$_3$
CH$_2$=CHSi(OCH$_2$CH$_2$OCH$_3$)$_3$
C$_6$H$_5$Si(OCH$_3$)$_3$
CH$_3$Si(OCH$_3$)$_2$[OCH(CH$_3$)CH$_2$OCH$_3$]
Si(OCH$_3$)$_4$
Si(OC$_2$H$_5$)$_4$
Si(O—n—C$_3$H$_7$)$_4$
Si(O—n—C$_4$H$_9$)$_4$ The fillers (C$^4$) are used in a proportion of 0 to 150 parts, preferably 5 to 120 parts, per 100 parts of the polymers (A$^4$). They are identical to the fillers which have already been described (C$^1$), used for the preparation of single-component base compositions.

As above-indicated, the two-component base compositions are catalyzed by addition of the organic tin system produced by mixing the chelated derivative with the nonchelated derivative; the amount used is in the range from 0.01 to 10 parts, preferably 0.1 to 8 parts, per 100 parts of the two-component base composition.

Other ingredients may be introduced in addition to the principal constituents of the single-component and two-component base compositions, that is to say, (1) the diorganopolysiloxane polymers ($A^1$) to ($A^4$) which are blocked by a hydroxyl radical and/or alkoxy radicals at the end of the polymer chain, (2) organosilicon crosslinking agents ($B^1$) to ($B^4$) containing hydrolyzable groups, (3) the inorganic fillers ($C^1$) to ($C^4$) and (4) the adhesion promoters ($D^1$) and the compounds ($D^2$) and ($D^3$).

These ingredients include organosilicon compounds, chiefly polymers, which are capable of modifying the physical characteristics of the compositions according to the invention (which are produced by mixing the bases with the tin catalyst) and/or the mechanical properties of the silicone elastomers produced from these compositions.

These compounds are well known and include, for example:

(i) $\alpha,\omega$-bis(triorganosiloxy)diorganopolysiloxane polymers having a viscosity of at least 10 mPa.s at 25° C., in which the organic radicals bonded to the silicon atoms are selected from among methyl, vinyl or phenyl radicals, preferably at least 80% of the radicals being methyl radicals and not more than 3% being vinyl radicals; $\alpha,\omega$-bis(trimethylsiloxy)dimethylpolysiloxane oils having a viscosity of 10 mPas. at 25° C. to 1,500 mPa.s at 25° C. are preferably used, (ii) liquid, branched methyl polysiloxane polymers containing from 0.1 to 8% of hydroxyl groups bonded to the silicon atoms, including $(CH_3)_3SiO_{0.5}$, $(CH_3)_2SiO$ and $CH_3SiO_{1.5}$ recurring units distributed such as to provide a ratio $(CH_3)_3SiO_{0.5}/(CH_3)_2SiO$ of 0.01 to 0.15 and a ratio $CH_3SiO_{1.5}/(CH_3)_2SiO$ of 0.1 to 1.5, (iii) $\alpha,\omega$-di(hydroxy)dimethylpolysiloxane oils having a viscosity of 10 to 300 mPa.s at 25° C. and $\alpha,\omega$-di(hydroxy)methylphenylpolysiloxane oils having a viscosity of 200 to 1,000 mPa.s at 25° C., and (iv) diphenylsilanediol and 1,1,3,3-tetramethyldisiloxanediol.

The above $\alpha,\omega$-bis(triorganosiloxy)diorganopolysiloxane polymers may be completely or partially replaced with organic compounds which are inert towards the various constituents of the base compositions and which are miscible at least with the diorganopolysiloxane polymers ($A^1$) to ($A^4$). As specific examples of these organic compounds, representative are the polyalkylbenzenes obtained by alkylation of benzene with long-chain olefins, especially the olefins containing 12 carbon atoms produced by propylene polymerization. Organic compounds of this type are described, for example, in French Pat. Nos. 2,392,476 and 2,446,849.

Each of the above organosilicon compounds may be employed in a proportion of 1 to 100 parts, preferably 3 to 75 parts, per 100 parts of diorganopolysiloxanes ($A^1$) to ($A^4$).

Ingredients which are not organosilicon compounds may also be introduced, for example, heat stabilizers. These compounds improve the heat resistance of the silicone elastomers. They may be selected from among carboxylic acid salts, rare earth oxides and hydroxides and, more especially, ceric oxides and hydroxides, as well as from pyrogenic titanium dioxide and the various iron oxides. From 0.1 to 15 parts, preferably 0.15 to 12 parts, of heat stabilizers are advantageously used per 100 parts of the diorganopolysiloxanes ($A^1$) to ($A^4$).

In order to produce the compositions according to the invention, it is necessary, in the case of the single-component compositions, to use an apparatus which allows the various main constituents, to which the abovementioned adjuvants and additives may be added if desired, to be intimately mixed in the absence of moisture and with or without the introduction of heat.

All such ingredients may be charged into the apparatus in any order of addition. Thus, the diorganopolysiloxane polymers ($A^1$) to ($A^3$) and the fillers ($C^1$ to $C^3$) may be mixed first and then the crosslinking agents ($B^1$) to ($B^3$), the compounds ($D^1$) to ($D^3$) and the organic tin system may then be added to the resulting paste.

It is also possible to mix the polymers ($A^1$) to ($A^3$), the crosslinking agents ($B^1$) to ($B^3$) and the compounds ($D^1$) to ($D^3$) and then to add the fillers ($C^1$) to ($C^3$) and the organic tin system. During these operations, the mixtures may be heated to a temperature in the range 50°–180° C. at atmospheric pressure, or at a reduced pressure, in order to promote the removal of volatile materials, such as water and low molecular weight polymers.

Compositions which are prepared in this manner may be used as such, or in the form of a dispersion in organic diluents. These diluents are preferably conventional, commercially available materials selected from among:

(i) halogenated or non-halogenated aliphatic, alicyclic or aromatic hydrocarbons, such as n-heptane, n-octane, cyclohexane, methylcyclohexane, toluene, xylene, mesitylene, cumene, tetralin, decalin, perchloroethylene, trichlororethane, tetrachloroethane, chlorobenzene or orthodichlorobenzene, (ii) aliphatic and alicyclic ketones, such as methyl ethyl ketone, methyl isobutyl ketone, cyclohexanone or isophorone, and (iii) esters, such as ethyl acetate, butyl acetate, and ethoxyethyl acetate.

The amounts of diluents which are introduced must be sufficient to produce stable dispersions which spread readily over the substrates. These amounts depend essentially on the nature and on the viscosity of the initial organopolysiloxane compositions. Their proportions may therefore vary widely; nevertheless, it is recommended to produce dispersions containing from 15 to 85% by weight of diluents.

The single-component compositions according to the invention, which are used as such, namely, undiluted, or in the form of dispersions in diluents, are stable in storage in the absence of water, and cure at ambient temperature and above (after removal of the solvents in the case of the dispersions) in the presence of water, to form elastomers.

After the compositions as such have been deposited onto solid substrates, in a moist atmosphere, it is found that a process of curing to elastomers begins to take place and proceeds from the outside towards the interior of the deposited mass. A surface skin forms first and this is followed by in-depth crosslinking.

The complete skin formation, observed when the surface is no longer tacky to the touch, requires a period of time which may be in the range of from 1 minute to 55 minutes; this time period depends upon the degree of relative humidity of the atmosphere surrounding the compositions and on the ease with which they crosslink.

Furthermore, the in-depth cure of the deposited layers, which must be sufficient to enable the elastomers formed to be demolded and handled, requires a much longer period of time. In fact, this period depends not only on the abovementioned factors concerning the formation of a nontacky feel, but also on the thickness of the deposited layers, which generally ranges from 0.5 mm to several centimeters. This longer period of time may last from 10 minutes to 20 hours.

The single-component compositions may be employed for numerous applications, such as sealing in the building industry, assembly of a very wide variety of materials (metals, plastics, natural and synthetic rubbers, wood, cardboard, crockery, brick, ceramic, glass, stone, concrete, masonry components), insulation of electrical conductors, coating of electronic circuits, and the preparation of molds used for the production of articles made of synthetic resins or foams.

The above-mentioned dispersions of these compositions in the diluents may be employed for impregnating inorganic, synthetic, organic, metallic, woven or nonwoven products and articles in thin layers, and for coating sheets consisting of metal, plastics or cellulose-based substances. The deposition may be carried out, for example, by dipping or by spraying; in the latter case, a paint spray gun which enables uniform coatings with a thickness of 5 to 300 $\mu$m to be obtained is used. After the dispersions have been sprayed on, the diluents evaporate off and the compositions which are released cure to a rubbery film.

The production of the two-component compositions according to the invention is also carried out by mixing the various constituents in suitable apparatus. To obtain homogeneous compositions, it is preferable to first mix the polymers ($A^4$) with the fillers ($C^4$); the combination may then be heated for at least 30 minutes at a temperature above 80° C. to ensure that the fillers are completely wetted by the oils. The other constituents, that is to say, the crosslinking agents ($B^4$), the organic tin system, and, if desired, the various additives and adjuvants and even water, may then be added to the resulting mixture, which is preferably heated to a temperature below 80° C., for example, on the order of ambient temperature.

Such compositions are not stable in storage and must consequently be used promptly, for example, within a 40 minute period.

The various additives and adjuvants are the same as those introduced into the single-components compositions. Once again, particular mention must be made of $\alpha,\omega$-bis(triorganosiloxy)diorganopolysiloxane polymers having a viscosity of at least 10 mPa.s at 25° C., in which the organic radicals bonded to the silicon atoms are methyl, vinyl and phenyl radicals. $\alpha,\omega$-Bis(trimethylsiloxy)dimethylpolysiloxane oils having a viscosity preferably from 20 mPa.s at 25° C. to 1,000 mPa.s at 25° C. are preferably employed.

To promote the cure of two-component compositions which are used in the form of thick layers, the thickness of which is, for example, greater than 2 cm, it is recommended to introduce water in a proportion not exceeding 1 part per 100 parts of the polymers ($A^4$).

This water addition is unnecessary, if a sufficient amount of it is already present in the fillers ($C^4$). To make it easier to incorporate, the water is preferably added in the form of a dispersion in a paste of, for example, the abovementioned $\alpha,\omega$-bis(triorganosiloxy)diorganopolysiloxane oils and the fillers ($C^4$).

For packaging and storage, the two-component compositions therefore cannot contain all of the principal constituents, namely, the polymers ($A^4$), the crosslinking agent ($B^4$), the fillers ($C^4$) and the organic tin system. On an industrial scale, they must be manufactured in the form of two components, both of which are stable when stored.

A first component, which is stable in storage, may comprise, for example, the constituents ($A^4$), ($B^4$) and ($C^4$); it is preferably prepared by adding the crosslinking agents ($B^4$) to the homogeneous mixture produced by kneading the polymers ($A^4$) with the fillers ($C^4$).

The second component then comprises the organic tin system.

Other ways of formulating the two-component compositions may be selected: for example, a first component containing the polymers ($A^4$) and the fillers ($C^4$), and a second component containing the crosslinking agents ($B^4$) and the organic tin system.

In many applications, it is preferable that both components should be sufficiently fluid such that when they are mixed they readily form compositions whose viscosity ranges, for example, from 10,000 to 800,000 mPa.s at 25° C.

These compositions, which remain sufficiently fluid for at least 40 minutes, preferably for at least 80 minutes, after the two components have been mixed, may be used more especially for the manufacture of molds made of silicone elastomers; they may, however, be used for other applications, such as the covering of electronic hardware and the coating of metal, textile or cellulose-based surfaces.

The molds which are manufactured are intended to reproduce articles made of cellular or other materials consisting of organic polymers. Among these materials, exemplary are the polyurethanes, polyesters, polyamides and polyvinyl chloride. It is recommended, however, to use these molds for the reproduction of polyurethane articles, in view of the fact that they resist corrosion by the constituents of the mixtures (especially by polyisocyanates) used to produce polyurethane materials.

The introduction of a catalyst according to the invention, based on an organic tin derivative, enables optimum application conditions to be obtained with the single- and two-component compositions. It then makes it possible to produce elastomers having tensile properties which are stable with time and independent of the age and of the storage conditions of the compositions.

In order to further illustrate the present invention and the advantages thereof, the following specific examples are given, it being understood that same are intended only as illustrative and in nowise limitative. In said examples to follow, all parts and percentages are by weight, unless otherwise indicated.

EXAMPLE 1

A composition $P_1$ was prepared by mixing:
(i) 100 parts of an $\alpha,\omega$-dihydroxydimethylpolysiloxane oil having a viscosity of 10,000 mPa.s at 25° C.,
(ii) 70 parts of an $\alpha,\omega$-bis(trimethylsiloxy)dimethylpolysiloxane oil having a viscosity of 800 mPa.s at 25° C.,
(iii) 55 parts of a pyrogenic silica having a specific surface area of 300 m$^2$/g, treated with hexamethyldisilazane,
(iv) 50 parts of ground quartz having a mean particle diameter of 5 micrometers, and (v) 10 parts of a paste made from 90 parts of ,-dihydroxydimethylpolysiloxane oil, mentioned above, having a viscosity of 10,000 mPa.s at 25° C., 5 parts of a pyrogenic silica having a specific surface area of 150 m²/g and 5 parts of water.

A crosslinking system $C_1$ was prepared by mixing, at ambient temperature, 82.5 parts of an ethyl polysilicate containing 40% of silica with 17.5 parts of an organic tin mixture. The organic tin mixture consisted of di-n-butyltin dilaurate or of the tin chelate ($CR_1$) or a combination of di-n-butyltin dilaurate with the tin chelate ($Ch_1$) of the formula:

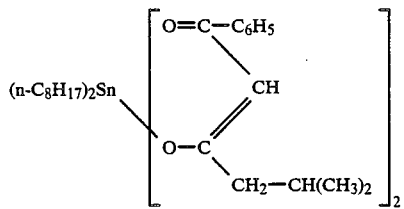

The combination contained 75%, 50% or 25% by weight of either of the constituents.

The composition $P_1$ was catalyzed by mixing 100 parts of this composition with two parts of the crosslinking system $C_1$. The latter was used as such, freshly prepared, or after it had been subjected to aging at 70° C. for a period of 66 hours, 185 hours or 329 hours.

The spreading time of the catalyzed composition was then determined by noting the period of time during which this composition was in a sufficiently fluid state to spread under its own weight and thus to adopt the configuration of the internal space of the containers into which it was poured.

The test employed for assessing spreadability was the following:

The freshly catalyzed composition (15 grams) was poured into a cylindrical aluminum dish 4 cm in diameter; after a period not exceeding 5 minutes, it must have a surface which is perfectly horizontal.

After several hours at ambient temperature, the catalyzed composition was converted into a silicone elastomer; the Shore A hardness of the formed elastomer was measured 24 hours after the preparation of this catalyzed composition. The results relating to the spreading time and the Shore A hardness values are reported in Table 1 below:

TABLE 1

| Composition of the organic tin system (in % by weight) | | | | | | | |
|---|---|---|---|---|---|---|---|
| | Di-N—butyltin dilaurate | 100 | | 75 | | 50 | |
| | Tin chelate ($CH_1$) | 0 | | 25 | | 50 | |
| Aging period of the crosslinking system $C_1$ at 70° C. (in hours) | | Spread time (in min) | Shore A hardness | Spread time (in min) | Shore A hardness | Spread time (in min) | Shore A hardness |
| 0 | | 170 | 20 | 184 | 18 | 178 | 18 |
| 66 | | 190 | 18 | 164 | 18 | 180 | 18 |
| 185 | | 100 | 20 | 103 | 21 | 146 | 20 |
| 329 | | 84 | 20 | 85 | 20 | 125 | 20 |
| Composition of the organic tin system (in % by weight) | | | | | | | |
| | Di-N—butyltin dilaurate | | | 25 | | 0 | |
| | Tin chelate ($CH_1$) | | | 75 | | 100 | |
| Aging period of the crosslinking system $C_1$ at 70° C. (in hours) | | | | Spread time (in min) | Shore A hardness | Spread time (in min) | Shore A hardness |
| 0 | | | | 198 | 17 | 300 | 5 |
| 66 | | | | 190 | 18 | 360 | 5 |
| 185 | | | | 168 | 19 | 400 | 5 |
| 329 | | | | 148 | 19 | 400 | 5 |

It was found that the spreading times became markedly shorter when the period of aging of the crosslinking system $C_1$ at 70° C. exceeded 66 hours. However, the magnitude of this change depended on the composition of the organic tin system. When this system was di-n-butyltin dilaurate, a 50% drop in spreading time was noted after 329 hours at 70° C.; when this system was a mixture of 25% of di-n-butyltin dilaurate and 75% of tin chelate ($Ch_1$), the drop was greatly attenuated and barely exceeded 25%. In the absence of di-n-butyltin dilaurate, it was found that the Shore A hardness was very clearly inadequate for a thorough cure.

EXAMPLE 2

A composition $P_2$ was prepared by mixing:
(i) 100 parts of an α,ω-dihydroxydimethylpolysiloxane oil having a viscosity of 20,000 mPa.s at 25° C.,
(ii) 100 parts of an α,ω-bis(trimethylsiloxy)dimethylpolysiloxane oil having a viscosity of 500 mPa.s at 25° C.,
(iii) 50 parts of a pyrogenic silica having a specific surface area of 200 m²g, treated with hexamethyldisilazane,
(iv) 100 parts of ground quartz having a mean particle diameter of 5 μm, and
(v) 15 parts of the paste containing 5% of water, heretofore employed as a constituent of the composition of Example 1.

The composition $P_2$ was catalyzed by mixing 100 parts of this composition with 2 parts of a crosslinking system $C_2$, similar to the crosslinking system $C_1$ used in Example 1, that is to say, consisting of 82.5 parts of alkyl polysilicate and 17.5 parts of an organic tin derivative. The organic tin system consisted of di-n-butyltin dilaurate or of a combination containing, by weight, 50% of di-n-butyltin dilaurate, 35% of tin chelate ($Ch_1$) of the formula:

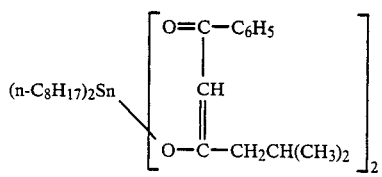

and 15% of tin chelate (Ch₂) of the formula:

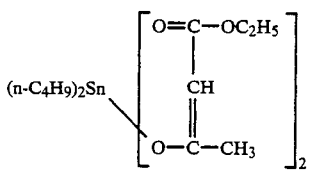

The crosslinking agent C₂ was used as such, freshly prepared, or after having been subjected to aging for 2, 6, 9, 10 and 12 days at 75° C.

The spreading time of the catalyzed composition was determined as indicated in Example 1; the Shore A hardness of the silicone elastomer obtained was also determined, 24 hours after the forming of the catalyzed composition. The results are reported in Table 2 below:

TABLE 2

| Composition of the organic tin system (in % by weight) | Di-n-butyltin dilaurate | 100 | | 50 | |
|---|---|---|---|---|---|
| | Tin Chelate (CH₁) | 0 | | 35 | |
| | Tin Chelate (CH₂) | 0 | | 15 | |
| Aging period of the crosslinking system C₂ at 70° C. (in days) | | Spread time (in min) | Shore A hardness | Spreed time (in min) | Shore A hardness |
| 0 | | 60 | 16 | 64 | 17 |
| 2 | | 66 | 17 | 79 | 14 |
| 6 | | 37 | 18 | 67 | 17 |
| 9 | | | | 55 | 17 |
| 10 | | 24 | 18 | | |
| 12 | | 20 | 18 | 45 | 17 |

It was found that the spreading times became shorter when the aging time of the crosslinking system reached 6 days or more. This drop was very considerable, on the order of 70% after 12 days, in the case where an organic tin system containing di-n-butyltin dilaurate was used; it was only 30% in the case where a mixed system containing the combination of di-n-butyltin dilaurate with 2 diorganotin chelates was used.

EXAMPLE 2b 100 parts of the composition P₁ used in Example 1 were catalyzed with 5 parts of a crosslinking system C₃ similar to the crosslinking system C₁ used in Example 1; the organic tin system consisted of di-n-butyltin dilaurate and of its combination, in the weight ratio 50/50, with the chelate Ch₁ of the formula:

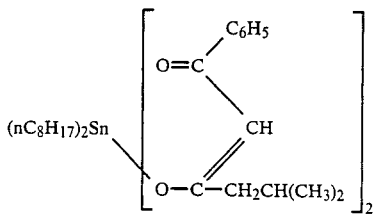

The catalyzed composition was deposited onto a polyethylene plaque in the form of a layer 2 mm in thickness. After a period of rest of 24 hours open to the atmosphere, the formed elastomer film was demolded and permitted to age for a variable number of days at a temperature of 20° C.

The Shore A hardness (SAH) and the tear strength (TS) (expressed in kN/m) of the film which had been subjected to the abovementioned aging times, were measured. The results are reported in Table 3 below:

TABLE 3

| Composition of the organic tin system (in % by weight) | Di-n-butylin dilaurate | 100 | | 50 | |
|---|---|---|---|---|---|
| | Tin Chelate (CH₁) | 0 | | 50 | |
| Aging period of the 2 mm thick films at 25°C. | | SAH | TS | SAH | TS |
| 1 day | | 26 | — | 26 | — |
| 10 days | | 37 | 11 | 38 | 13 |
| 30 days | | 32 | 14 | 33 | 13 |
| 60 days | | 39 | 7.5 | 38 | 11 |
| 90 days | | 39 | 7 | 38 | 9 |
| 150 days | | 39 | 6 | 38 | 8 |

After the elastomers had been aged for 60 days at ambient temperature, a marked reduction in the value of the tear strength was found in the case where an organic tin system consisting solely of di-n-butyltin dilaurate was used. This decrease did not take place when a 50/50 by weight combination of dibutyltin dilaurate and tin chelate (Ch₁) was used.

EXAMPLE 3

A crosslinking system C₄, similar to the crosslinking system C₁ described in Example 1, as prepared by mixing, at ambient temperature, 82.5 parts of an ethyl polysilicate containing 40% of silica with 17.5 parts of an organic tin system. This system was a di-n-butyltin diversatate (versatic acid is a saturated synthetic monocarboxylic acid, tertiary in the alpha position relative to the carboxyl group, consisting of a mixture of C₉, C₁₀ and C₁₁ acids), or the combination, in a 50/50 ratio by weight, of such di-n-butyltin diversatate with the chelate Ch₁ of the formula:

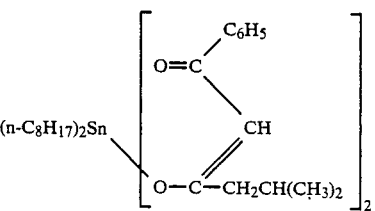

The composition P₁ described in Example 1 was then catalyzed by mixing 100 parts of this composition with 5 parts of the crosslinking system C₄; the spreading time of the catalyzed composition was determined as indicated in Example 1. Two determinations of Shore A hardness of the silicone elastomer produced by curing the catalyzed composition were made by performing measurements on one face surface of a specimen of elastomer which had cured in the absence of air and on another face surface which had cured in ambient air. The specimen was produced by casting the catalyzed composition, over a height of 4 cm, into a cylindrical aluminum flask 4 cm in diameter, the casting being followed by curing the elastomer. This was demolded after 24 hours and the elastomer specimen was used for measuring the Shore A hardness of the confined face which was in contact with the bottom of the aluminum flask and the Shore A hardness of the face which was exposed to the ambient air.

Furthermore, other types of specimens, which were films of elastomer 2 mm in thickness, produced according to the method described in Example 2b, were permitted to age at 20° C. The Shore A hardness (SAH) and the tear strength (TS) expressed in kN/m) were measured on specimens which had been subjected to aging periods of 10, 30, 60, 90 and 150 days.

The results are reported in Tables 4 and 5 below:

TABLE 4

| Composition of the organic tin system in % by weight | Di-n-butylin diversatate | 50 | 100 |
|---|---|---|---|
| | Chelate CH$_1$ | 50 | 0 |
| Properties measured: | | | |
| Spread time in minutes: | | 35 | 40 |
| Shore A hardness, confined face: | | 14 | 7 |
| Shore A. hardness, face exposed to ambient air: | | 25 | 13 |

TABLE 5

| Catalyst mixture (in % by weight) | Di-n-butyltin diversatate | 100 | | 50 | |
|---|---|---|---|---|---|
| | Chelate (CH$_1$) | 0 | | 50 | |
| Aging time (in days) | | SAH | TS | SAH | Ts |
| 10 days | | 32 | 21 | 36 | 24 |
| 30 days | | 31 | 20 | 33 | 22 |
| 60 days | | 33 | 16 | 38 | 19.5 |
| 90 days | | 34 | 15 | 38 | 20 |
| 150 days | | 34 | 10 | 38 | 14.5 |

It was noted that, when employed alone, di-n-butyltin diversatate did not enable production of an elastomer having an acceptable Shore A hardness after 24 hours; in particular, the confined face barely vulcanized after 24 hours, could not withstand the normal demolding handling without tearing.

After aging, at the end of 60 days, it appeared that di-n-butyltin diversatate alone produced an elastomer which had a SAH and especially a TS which were lower than those produced by its combination with the chelate Ch$_1$.

EXAMPLE 4

The following materials were ground wet in a kneader:
(i) 100 parts of an $\alpha,107$ -dihydroxydimethylpolysiloxane oil having a viscosity of 175,000 mPa.s at 25° C.,
(ii) 20 parts of a bis(trimethylsiloxy)dimethylpolysiloxane oil having a viscosity of 100 mPa.s at 25° C.,
(iii) 60 parts of calcium carbonate having a mean particle diameter of 5 micrometers, and
(iv) 10 parts of pyrogenic silica having a specific surface area of 150 m$^2$/g.

When the mass was homogeneous, added thereto was all of the solution produced by mixing 5.5 parts of silane of the formula Si(OCH$_2$CH$_2$OCH$_3$)$_4$, 2.5 parts of silane of the formula (CH$_3$O)$_3$Si(CH$_2$)$_3$NH—CH$_2$CH$_2$NH$_2$ and 0.035 part of the organic tin system which was prepared by mixing dibutyltin dilaurate with the tin chelate (Ch$_3$) of the formula:

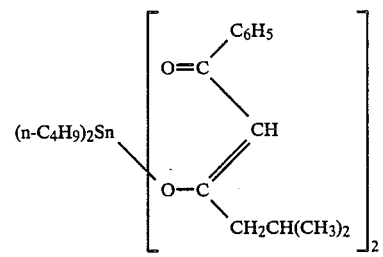

in a 50/50 molar ratio.

The single-component composition obtained in this manner was stored in the absence of moisture in sealed aluminum tubes; another composition was prepared which was identical to the above, except that only dibutyltin dilaurate was used as the organic tin system, the amount used being identical, i.e., 0.035 part.

This composition was also packaged in sealed aluminum tubes. The storage stability of both compositions was checked; for this purpose, the tubes containing them were left for 72 hours in an oven heated to 100° C.

The tubes were allowed to cool and their contents were spread out (together with the contents of the tubes which had not been subjected to a period of heating and which had undergone storage for a period of 1 month at ambient temperature) in the form of a layer 2 mm in thickness, in the open air, on a polytetrafluoroethylene plaque. The deposited layer was converted into a rubbery film; 24 hours after the deposition of the layer, the elastomer film was stripped and the tensile properties of the elastomers were measured after an aging period of 7 days at ambient temperature.

The results are reported in Table 6 below:

TABLE 6

| | Compositions catalyzed with the tin systems produced by mixing di-n-butyltin dilaurate with the chelate CH$_3$ | | Compositions catalyzed with di-n-butyltin dilaurate | |
|---|---|---|---|---|
| Tensile Properties | Content of the tubes stored at ambient temperature | Content of the tubes aged for 72 hours at 100° C. | Content of the tubes stored at ambient temperature | Content of the tubes aged for 72 hours at 100° C. |
| Shore A hardness | 16 | 15 | 15 | 9 |
| Tensile Strength (in MPa) | 1.28 | 1.05 | 1 | 0.7 |
| Elongation at break (in %) | 630 | 490 | 650 | 530 |

Inspection of the values of the tensile properties clearly indicate that in order to retain these properties over time, it is advantageous to use the di-n-butyltin dilaurate/chelate (Ch3) catalyst mixture rather than the di-n-butyltin dilaurate alone.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organotin curing catalyst comprising admixture of (i) a diorganotin bis($\beta$-diketonate) and (ii) an organotin (IV) compound devoid of $\beta$-diketonato functional group and containing at least one tin atom, each such tin atom bearing two organic radicals bonded thereto via a Sn—C bond, with each of the remaining valencies being satisfied by organic or inorganic radicals bonded thereto via a Sn—O or Sn—S bond, by halogen atoms, by hydroxyl groups or by oxygen atoms.

* * * * *